United States Patent [19]

Kishigami et al.

[11] Patent Number: 5,777,693
[45] Date of Patent: Jul. 7, 1998

[54] DIVERSITY RECEIVING APPARATUS FOR A MOBILE UNIT

[75] Inventors: Takaaki Kishigami, Kawasaki; Masahiro Mimura; Makoto Hasegawa, both of Tokyo; Tadaaki Ushiyama, Yokohama; Masahiko Nakamura, Ebina; Yoshinori Takagi, Tokyo, all of Japan

[73] Assignee: Matsushita Electric Industrial Co., Ltd., Japan

[21] Appl. No.: 690,904

[22] Filed: Aug. 1, 1996

Related U.S. Application Data

[62] Division of Ser. No. 535,580, Sep. 28, 1995, abandoned.

[30] Foreign Application Priority Data

Oct. 4, 1994 [JP] Japan .................. 6-240064
Jun. 13, 1995 [JP] Japan .................. 7-145991

[51] Int. Cl.⁶ .................................................. H04N 5/44
[52] U.S. Cl. .................. 348/731; 348/725; 455/277.1; 455/277.2
[58] Field of Search .................. 348/706, 725; 455/277.1, 277.2; 343/876; H04N 5/268, 5/44

[56] References Cited

U.S. PATENT DOCUMENTS 5,303,396  4/1994  Oojagi et al. .................. 455/134
5,335,010  8/1994  Lindemeier et al. .................. 348/706

Primary Examiner—John K. Peng
Assistant Examiner—Nathan J. Flynn
Attorney, Agent, or Firm—Rossi & Associates

[57] ABSTRACT

In a first diversity receiving apparatus, during an antenna selection operation, one of antennas are selected such that each of antennas successively connected to a receiver for consecutive horizontal retrace periods but for horizontal scanning periods following the horizontal retrace period, the selected antenna showing a largest level at the previous antenna selection operation is connected to the receiver to detect levels derived from respective antennas. The antenna showing a largest level is selected at the current antenna selection operation to receive a radio wave television signal for the following M (a natural number) horizontal scanning cycles. M is changed in accordance with the phasing condition. For example, M is changed according to a speed of vehicle, a field intensity, a frequency of the received television signal, etc. The switching circuit and tuner may be provided doubly to prevent the affection of switching noise. A second apparatus determines the selected antenna by further detecting noise levels derived from the respective antennas during a vertical retrace period. A frequency of switching of antennas for determining the selected antenna is reduced to reduce a switching noise on the reproduced image or in the reproduced sound.

12 Claims, 23 Drawing Sheets

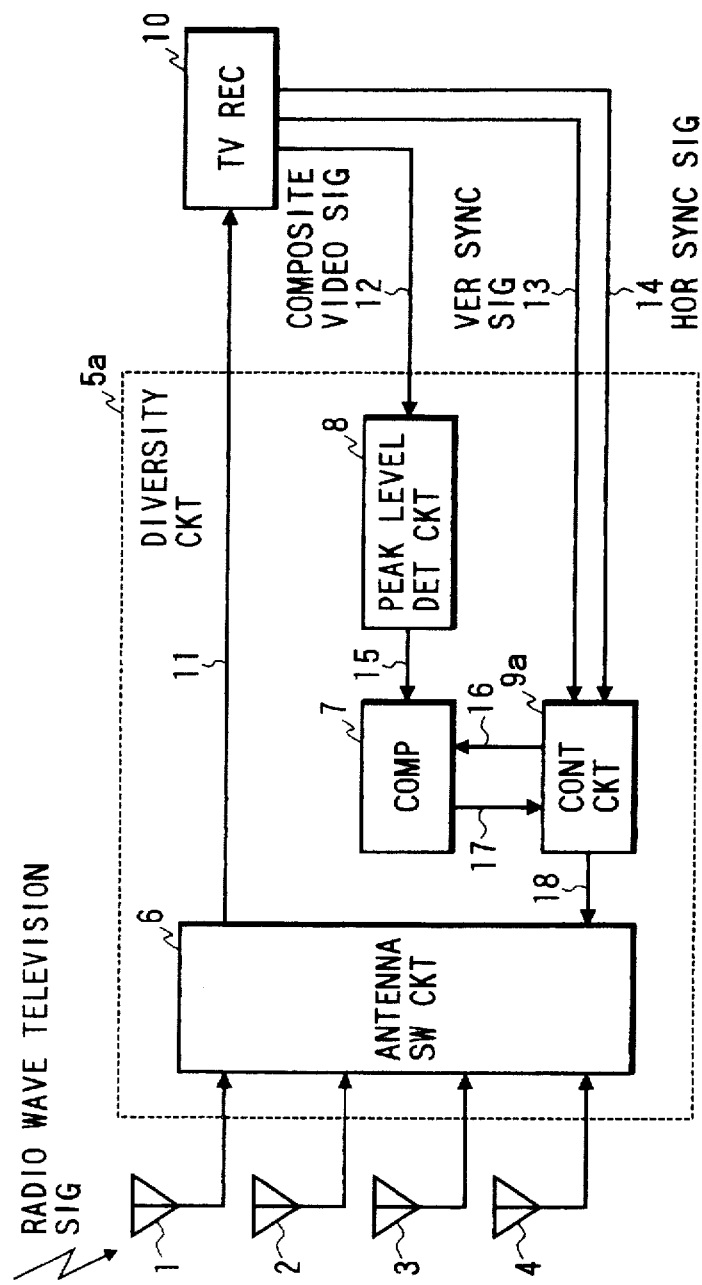

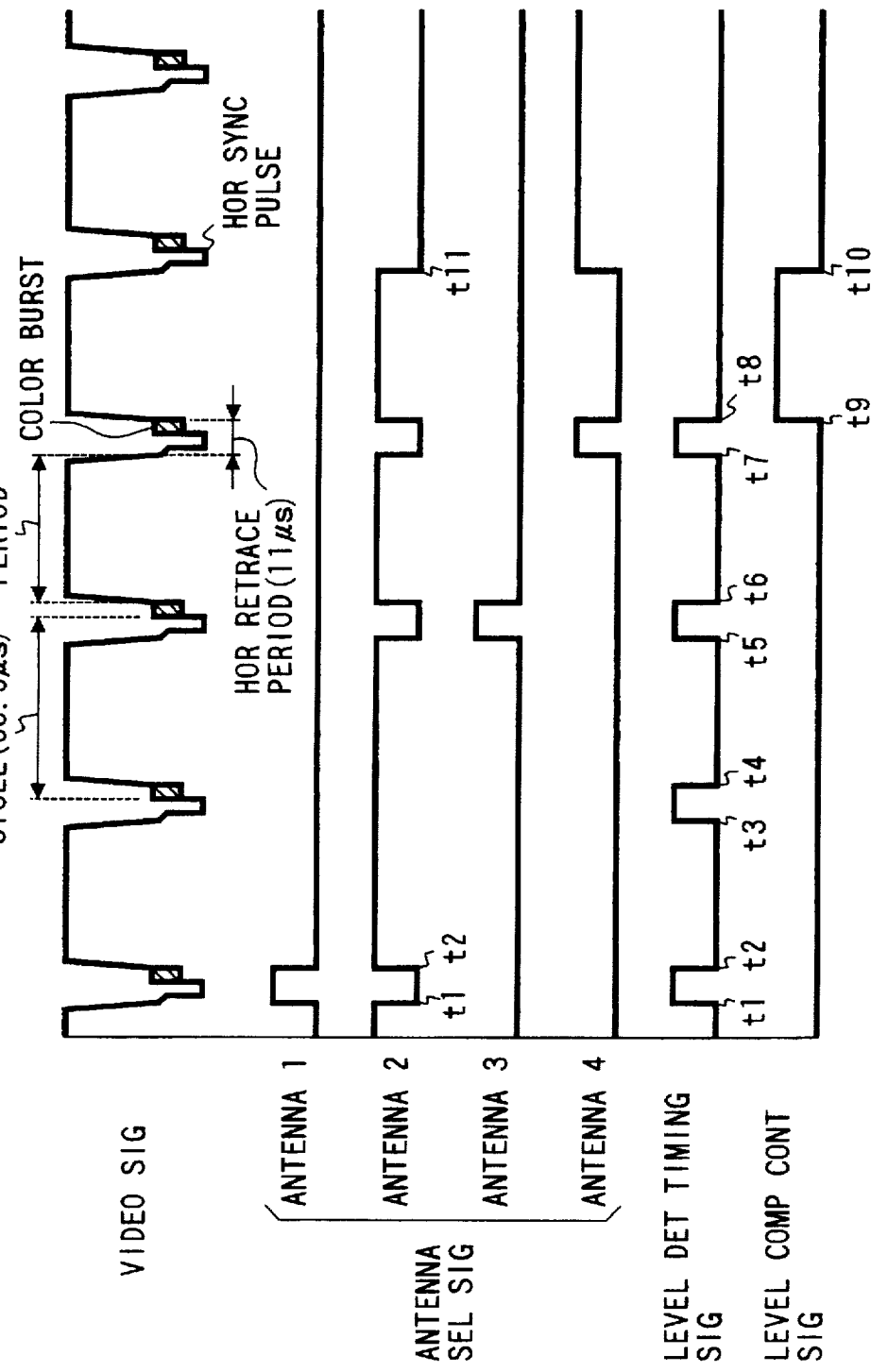

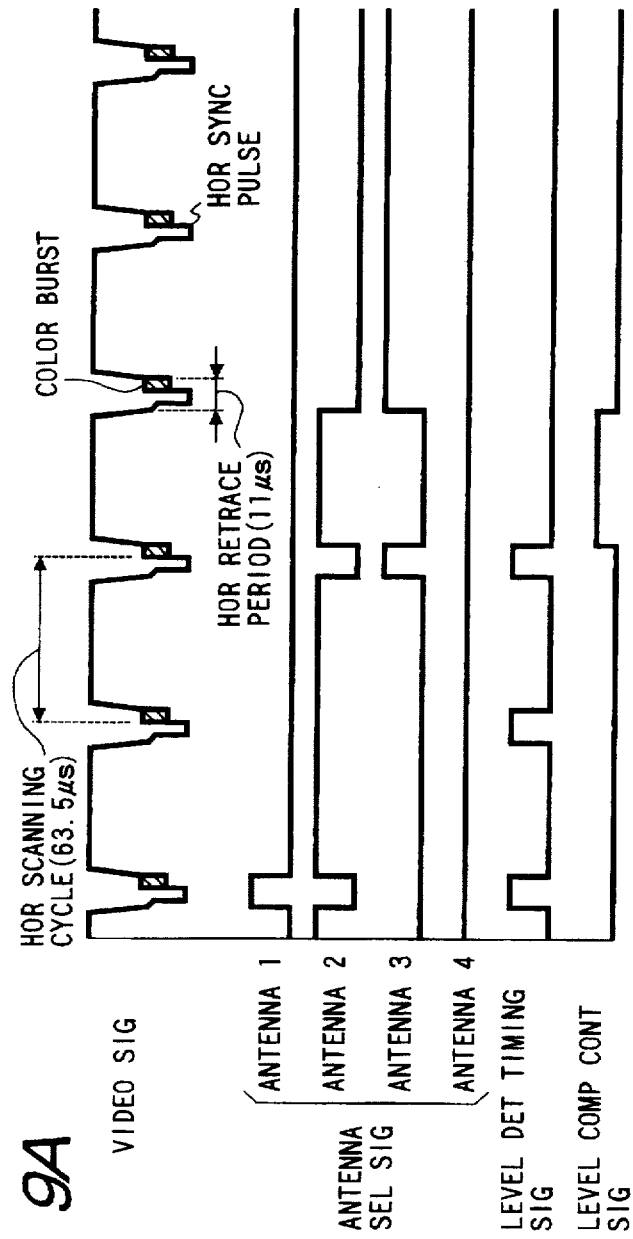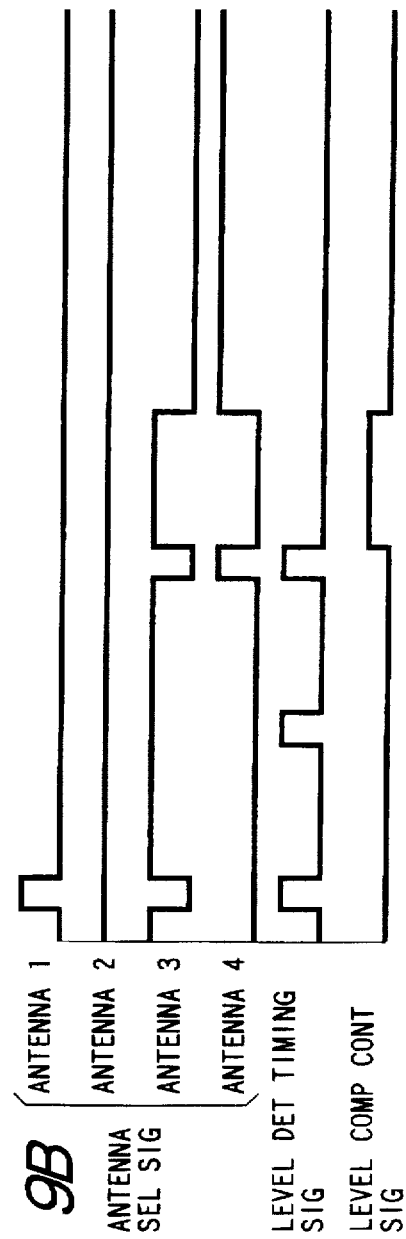
FIG. 9A
FIG. 9B

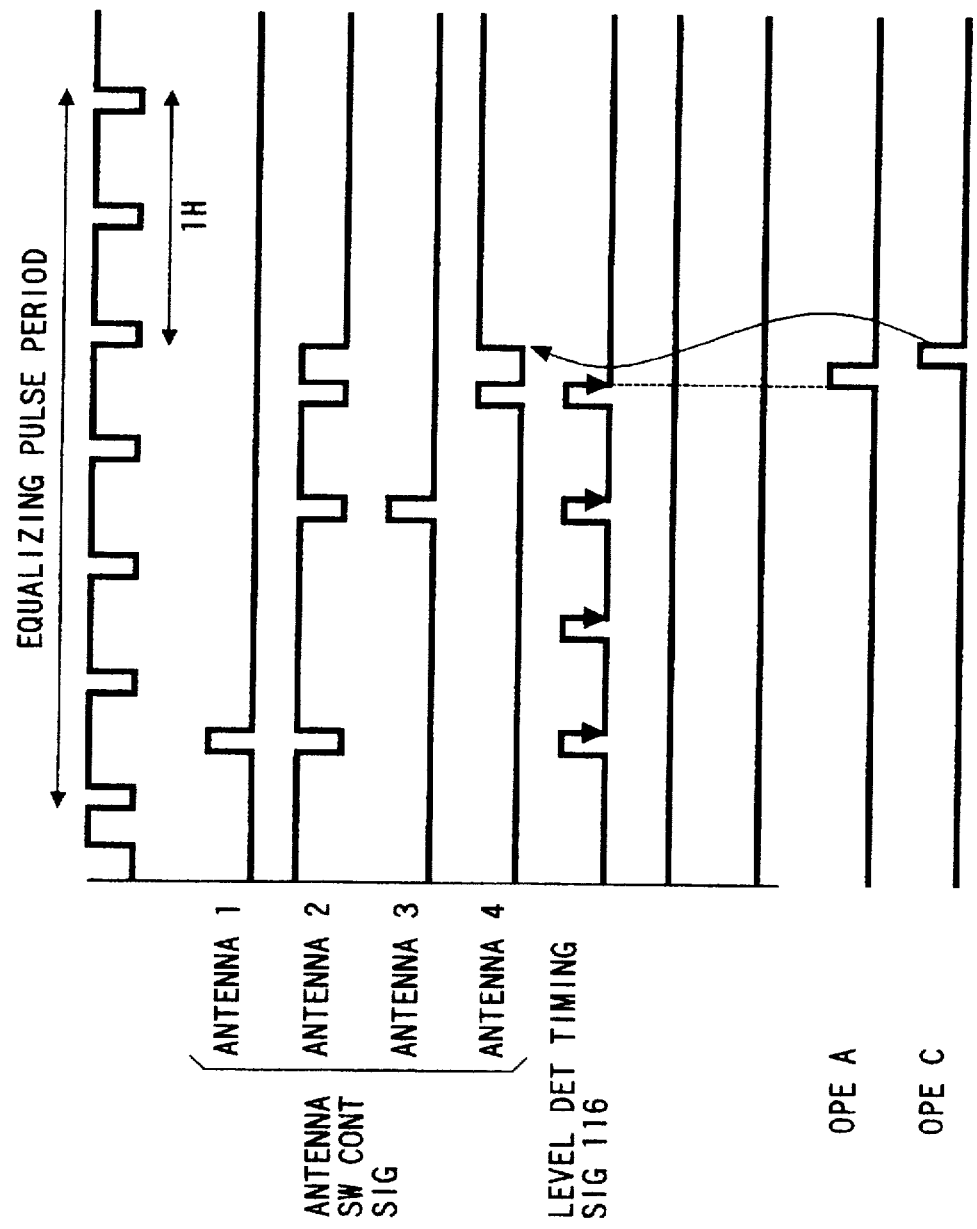

DIVERSITY RECEIVING APPARATUS FOR A MOBILE UNIT

This is a Division of application Ser. No. 08/535,580, filed Sep. 28, 1995 now abandon.

BACKGROUND OF THE INVENTION

1. Field of the Invention

This invention relates to a diversity receiving apparatus for a mobile unit.

2. Description of the Prior Art

A diversity receiving apparatus having a plurality of antennas and an antenna switching circuit for selectively coupling one of antennas to a television receiver to provide a surer reception of the television radio waves with an affection due to phasing suppressed is known.

FIG. 23 is a block diagram of a prior art diversity receiving apparatus for a vehicle. Radio wave signals received by antennas 201 to 204 are selectively supplied to a television receiver 206 by an antenna switching circuit 205. The television receiver 206 performs tuning to select a channel of video signal and detects the video signal 209, and synchronizing signal 210. A timing control circuit 208 controls the antenna switching circuit 205 to successively switch the selection of the antennas every horizontal scanning cycle during a vertical retrace interval for example. A level detection and comparing circuit 107 supplied with the video signal 209 detects a level of the video signal 209 every horizontal scanning cycle during the vertical retrace interval mentioned above and compares the levels of the video signal derived from the respective antennas. The timing control circuit 208 and antenna switching circuit 105 selects one of the antenna provides the largest level of the video signal and holds this switching condition until the net vertical retrace line period. Therefore, the antenna providing the largest level of the video signal is selected every vertical synchronizing period (1/60 sec).

However, there are problems that a stable receiving condition cannot be obtained when a speed of the vehicle is large or the radio wave is of UHF, that is, an affection of phasing is considerable.

SUMMARY OF THE INVENTION

The present invention has been developed in order to provide an improved diversity receiving apparatus.

In a diversity receiving apparatus, during an antenna selection operation, one of antennas are selected such that each of antennas successively is coupled to a receiver for consecutive horizontal retrace periods to detect levels derived from respective antennas but for horizontal scanning periods following the horizontal retrace periods, the selected antenna showing a largest level at the previous antenna selection operation is coupled to the receiver. The antenna showing a largest level is selected at the current antenna selection operation to receive a radio wave television signal for the following M (a natural number) horizontal scanning cycles. M is changed in accordance with the phasing condition. For example, M is changed according to a speed of the vehicle to which this diversity receiving apparatus is provided, a field intensity, a frequency of the received television signal, etc. The switching circuit and tuner may be provided doubly to prevent the affection of switching noise occurring on the reproduced picture image or in the reproduced sound. Another diversity receiving apparatus determines the selected antenna by further detecting noise levels derived from the respective antennas during a vertical retrace period. A frequency of switching of antennas for determining the selected antenna is reduced to reduce a switching noise on the reproduced image or in the reproduced sound.

According to this invention there is provided a first diversity receiving apparatus for a mobile unit, comprising: N antennas for receiving a radio wave television signal; a receiver for receiving the radio wave television signal from one of the N antennas, supplying a television signal including a horizontal synchronizing signal; a switching circuit for selectively coupling one of the N antennas and the receiver to supply the radio wave television signal from the one of N antennas to the receiver; a peak level detection circuit for detecting a peak level of the horizontal synchronizing signal; a control portion for controlling the switching circuit to couple the one of the N antennas and the receiver for M horizontal synchronizing cycles and controlling the switching circuit to couple each of N antennas and the receiver successively for the consecutive N horizontal retrace periods to detect peak levels of horizontal synchronizing signal derived from the N antennas but couple the one of N antennas and the receiver for N horizontal scanning periods following respective N horizontal retrace periods, for determining which antenna of the N antennas provides a largest one of the peak levels, and for controlling the switching circuit to couple the determined one of N antennas and the receiver for the following M horizontal scanning periods, the M and N being natural numbers more than one.

In the first diversity receiving apparatus, the value M is changed in accordance with a detected speed of the vehicle, a frequency of the received radio wave television signal which may be detected by a local oscillation signal, or a field intensity which may be detected by an automatic gain control signal supplied from an automatic gain control amplifier for amplifying the received radio wave television signal.

According to this invention, there is provided a second diversity receiving apparatus for a mobile unit, comprising: N antennas for receiving a radio wave television signal; a receiver for receiving the radio wave television signal from one of N antennas, supplying a television signal including a horizontal synchronizing signal; a switching circuit for selectively coupling one of N antennas and the receiving means to supply the radio wave television signal from one of N antennas to the receiver; a peak level detection circuit for detecting a peak level of the horizontal synchronizing signal; a detection circuit for detecting a speed detection circuit for detecting a speed of the vehicle; a comparing portion for comparing the detected speed with a predetermined value; a first storing portion for storing the first data; a second storing portion for storing second data indicating that the speed is lass than the predetermined value; a control portion for controlling the switching circuit to couple the one of the N antennas and the receiver for M horizontal synchronizing cycles and effecting an antenna selection operation by controlling the switching circuit to couple each of N antennas and the receiver successively for consecutive N horizontal retrace periods but couple the one of N antennas and the receiver for N horizontal scanning periods following N horizontal retrace periods to detect peak levels of horizontal synchronizing signal derived from N antennas, determining which antenna of N antennas provides a largest one and a smallest one of the peak levels, and controlling the switching circuit to couple the determined antenna providing a largest one of the peak levels and the receiver for the following M horizontal scanning cycles, wherein the control portion operates the first storing portion to store the first data indicative of one of N antennas providing a smallest one of the peak levels every antenna selection operations; operates the second storing portion to store the second data indicating that the speed is lass than the predetermined value when the speed is lass than the predetermined value from Kth to (K+1)th antenna selection operations; at Kth antenna selection operation, the control portion determines which antenna of (N−1) antennas providing the largest one of the peak levels except the antenna indicated by the first data stored at (K−1)th antenna selection operation when the speed is lass than the predetermined value, and at (K+1)th antenna selection operation, in the presence of the second data and when the speed is currently lass than the predetermined value, the control portion determines which antenna of (N−1) antennas providing the largest one of the peak levels excluding the antenna indicated by the first data stored at Kth antenna selection operation but including the antenna indicated by the first data stored at (K−1)th antenna selection operation, K, M, and N being natural numbers more than one.

According to this invention, there is provided a third diversity receiving apparatus for a mobile unit, comprising: a plurality of antennas for receiving a radio wave television signal; a first switching circuit for selecting one of the plurality of antennas and supplying the radio wave television signal from one of the plurality of antennas; a second switching circuit for selecting one of the plurality of antennas and supplying the radio wave television signal from one of the plurality of antennas; a divider circuit for coupling the plurality of antennas to first and second switching circuits; a first receiver for receiving the radio wave television signal from the first switching circuit and supplying a first channel of a first television signal including a synchronizing signal; a second receiver for receiving the radio wave television signal from the second switching circuit, the second receiver including a tuning circuit for effecting tuning to select a second channel of second television signal which is the same as the first channel; a level detection circuit for detecting a level of the second television signal; and a control portion for controlling the first switching circuit to couple one of the N antennas and the first receiver for M horizontal synchronizing cycles and controlling the second switching circuit to couple each of N antennas and the second receiver successively for the consecutive N horizontal retrace periods to detect peak levels of the horizontal synchronizing signal derived from N antennas, and for determining which antenna of N antennas provides a largest one of the peak levels, and for controlling the first switching circuit to couple the determined one of N antennas and the first receiver for the following M horizontal scanning periods, M and N being natural numbers more than one.

In the third diversity receiving apparatus may further comprise a level difference detection portion for detecting differences between the peak levels derived from the antenna coupled to the receiver for M horizontal scanning cycles and other antennas, a comparing portion for comparing the differences with a predetermined value, wherein the control portion controls the switching circuit to couple the determined one of N antennas and the receiver for the following M horizontal scanning periods only when any of the differences is larger than the predetermined value. Moreover, a signal to noise ratio detection circuit may be provided and the control portion determines which antenna of the N antennas provides a smallest signal to noise ratio when the differences is smaller than the predetermined value.

According to this invention, there is provided a fourth diversity receiving apparatus for a mobile unit, comprising: a plurality of antennas for receiving a radio wave television signal; a switching circuit for selecting one of the plurality of antennas and supplying the radio wave television signal from one of the plurality of antennas; a receiver for receiving the radio wave television signal from the switching circuit and supplying a television signal including a synchronizing signal; a level detection circuit for detecting a level of the television signal; a noise level detection circuit for detecting a noise level included in the television signal; and a control portion responsive to the synchronizing signal for determining one of plurality of antennas to be selected by the switching circuit for the following vertical scanning period of the television signal wherein the control portion controls the switching circuit and the level detection circuit to successively supply the radio wave television signal from each of the plurality of antennas to the receiver during a vertical retrace period of the television signal to detect the level derived from the each of plurality of antennas, controls the switching circuit and the noise level detection circuit to detect noise levels from a first antenna of the plurality of antenna selected for previous vertical scanning period of the television signal and a second antenna currently providing a largest level except the first antenna, and determines either of the first and second antennas to be selected by the switching circuit for the following vertical scanning period of the television signal in accordance with the detected noise levels.

In the fourth diversity receiving apparatus the control portion determines the first antenna for the following vertical scanning period having a smaller noise level and the control portion detects the second antenna by comparing the detected levels each other, and detects which antenna of the plurality of antennas provides a largest one of the levels among the plurality of antennas except the first antenna.

In the fourth diversity receiving apparatus, each of levels and noise levels are detected during the substantially consecutive recurrent periods which is a pedestal period between consecutive equalizing pulses included in the synchronizing signal.

In the fourth diversity receiving apparatus, the control portion selects the antenna providing a larger one of the detected levels of the video signal for the following vertical scanning period when the detected noise level is less than the predetermined value, that is, in a weak field intensity condition.

The fourth diversity receiving apparatus, may further comprise a field intensity prediction portion for operating the noise level detection circuit and the switching circuit to detect a noise level derived from the first antenna, for predicting a field intensity from a detected noise level by comparing the detected noise level derived from the first antenna with a predetermined value, the control portion selecting one of the plurality of antennas providing a larger detected level of the television signal derived from the plurality of antennas for the following vertical scanning period when the detected noise level derived from the first antenna is less than the predetermined value without controlling the switching circuit to detect noise levels from the plurality of antennas other than the first antenna.

The fourth diversity receiving apparatus may further comprise an operation portion for obtaining a difference between the detected noise levels of the first and second antennas, for comparing portion for comparing the difference with a predetermined value, the control portion selecting the first antenna for the following vertical scanning period when the difference is less than the predetermined value.

The fourth diversity receiving apparatus may further comprise an operation portion for obtaining a difference between the detected levels of the first and second antennas, wherein the control portion determines one of the plurality of antennas providing a largest level detected by the level detection circuit for the following vertical scanning period when the difference is larger than the predetermined value without controlling the switching circuit to detect noise levels from the plurality of antennas other than the first antenna, the control portion determines either of the first and second antennas to be selected by the switching circuit for the following vertical scanning period of the television signal in accordance with the detected noise levels when the difference is not larger than the predetermined value.

The fourth diversity receiving apparatus may further comprise a storing portion for storing data indicative of the second antenna and a comparing portion for comparing the data and the second data currently providing a largest level except the first antenna, the control portion determines the first antenna to be selected; by one of the plurality of antennas to be selected by the switching circuit for the following vertical scanning period of the television signal when the data agrees with the second data currently providing a largest level except the first antenna without controlling the switching circuit to detect noise levels from the plurality of antennas other than the first antenna.

According to this invention, there is provided a fifth diversity receiving apparatus provided to a mobile unit, comprising: a plurality of antennas for receiving a radio wave television signal; a first switching circuit for selecting one of the plurality of antennas and supplying the radio wave television signal from one of the plurality of antennas; a second switching circuit for selecting one of the plurality of antennas and supplying the radio wave television signal from one of the plurality of antennas; a divider circuit for coupling the plurality of antennas to first and second switching circuits; a first receiver for receiving the radio wave television signal from the first switching circuit and supplying a first channel of a first television signal including a synchronizing signal; a second receiver circuit for receiving the radio wave television signal from the second switching circuit, the second receiver including a tuning circuit for effecting tuning to select a second channel of second television signal which is the same as the first channel; a level detection circuit for detecting a level of the second television signal; a noise level detection circuit for detecting a noise level included in the second television signal; and a control portion responsive to the synchronizing signal for determining one of plurality of antennas to be selected by the first switching circuit for the following vertical scanning period of the television signal wherein the control portion controls the second switching circuit and the level detection circuit to successively supply the radio wave television signal from each of the plurality of antennas to the second receiver during a vertical retrace period of the television signal to detect the level derived from the each of plurality of antennas, controls the second switching circuit and the noise level detection circuit to detect noise levels from a first antenna of the plurality of antenna selected for previous vertical scanning period of the television signal and a second antenna currently providing a largest level except the first antenna, and determines either of the first and second antennas to be selected by the first switching circuit for the following vertical scanning period of the television signal in accordance with the detected noise levels.

In the fifth diversity receiving apparatus, the control portion determines the first antenna for the following vertical scanning period having a smaller noise revel. The control portion detects the second antenna by comparing the detected levels each other, and detects which antenna of the plurality of antennas provides a largest one of the levels among the plurality of antennas except the first antenna. The control portion controls the switching circuit and the level detection circuit to successively supply the radio wave television signal from each of the plurality of antennas to the second receiver for substantially consecutive recurrent periods of the vertical retrace period. Each of the substantially consecutive recurrent periods is a pedestal period between consecutive equalizing pulses included in the synchronizing signal.

In the above-mentioned diversity receiving apparatus, the peak levels, levels, noise levels may be detected from an intermediate-frequency television signal and the synchronizing signal is separated by a synchronizing signal separation circuit.

BRIEF DESCRIPTION OF THE DRAWINGS

The objects and features of the present invention will become more readily apparent from the following detailed description taken in conjunction with the accompanying drawings in which:

FIG. 1 is a block diagram of a diversity receiving apparatus for a mobile unit of a first embodiment;

FIG. 3 is a diagram of a time chart of the first embodiment;

FIGS. 9A and 9B are timing charts of the fourth embodiment;

FIG. 19 is a diagram of a timing chart of an eighth embodiment;

The same or corresponding elements or parts are designated with like references throughout the drawings.

DETAILED DESCRIPTION OF THE INVENTION

Figure 2A:
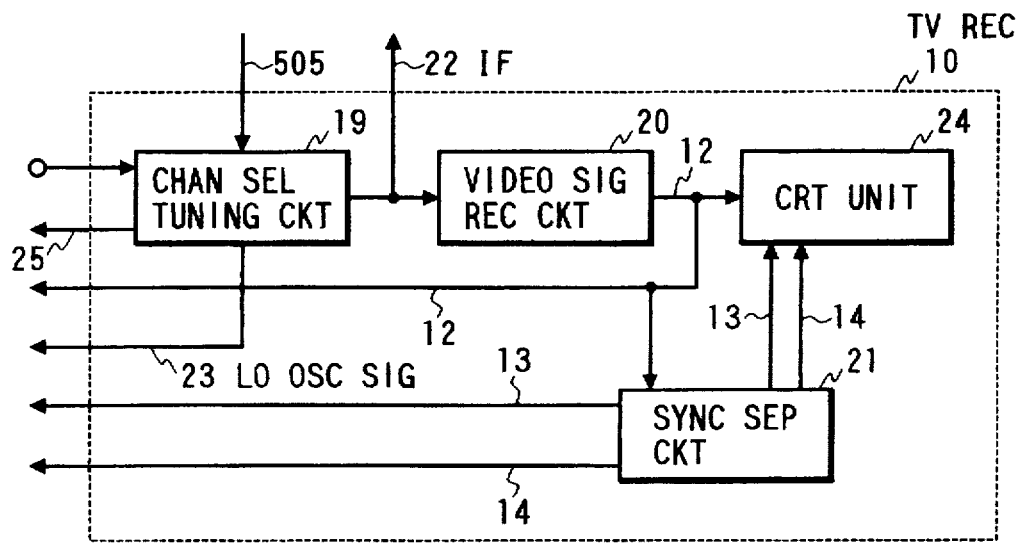
FIG. 2A is a block diagram of a television receiver shown in FIG. 1.

Hereinbelow will be described a first embodiment of this invention.

FIG. 1 is a block diagram of a diversity receiving apparatus for a mobile unit of the first embodiment.

The diversity receiving apparatus of the first embodiment, provided to a vehicle (not shown), for receiving a radio wave television signal, comprises antennas 1 to 4, mounted on a vehicle, for receiving a television radio wave signal 21, a diversity circuit 5a for receiving a television signal with suitable one of antennas 1 to 4, and a television receiver 10 for reproducing a video image and for supplying a composite video signal and vertical and horizontal synchronizing signals. The diversity circuit 5a comprises an antenna switching circuit 6 for selectively supplying one of outputs of the antennas 1 to 4, a television receiver 10 for receiving one of output of the antenna switching circuit 6, for reproducing a video image, for supplying a composite video signal 12, a vertical synchronizing signal 13, and a horizontal synchronizing signal 14, a peak level detection circuit 8 for detecting a peak level of a horizontal synchronizing pulse, a comparing circuit 7 for comparing peak levels detected for consecutive horizontal synchronizing interval from the peak level detection circuit 8, and a control circuit 9a for controlling the antenna switching circuit 6 to select one of antennas 1 to 4 in accordance with the comparing result 17 of the comparing circuit 7 in response to the vertical and horizontal signals 13 and 14.

FIG. 2A is a block diagram of the television receiver 10 shown in FIG. 1. The television receiver 10 comprises a channel selection tuning circuit 19 for tuning the received television radio wave signal to select a desired channel of a television signal and supplies an intermediate frequency signal 22, a video signal receiving circuit 20 for detecting a video signal 12 with amplifying from the intermediate frequency signal 22, a synchronizing signal separation circuit 21 for separating a vertical synchronizing signal 13 and a horizontal synchronizing signal 14 from the video signal 12, and a cathode ray tube unit 24 for reproducing a video image using the video signal 12, the vertical synchronizing signal 13, and the horizontal synchronizing signal 14.

The antennas 1 to 4, mounted on the vehicle, receive the television radio wave signal 21. The antenna switching circuit 6 supplies one of outputs of the antennas 1 to 4 to the television receiver 10 in response to a switching control signal 18. The television receiver 10 receives the output of the antenna switching circuit 6, effects tuning of one channel of television signal, and supplies the tuned television signal as the (composite) video signal 12 to the peak level detection circuit 8, and supplies the vertical and horizontal synchronizing signals 13 and 14 to the control circuit 9a. The control circuit 9a periodically effects the selection of each antenna. That is, the control circuit 9a supplies the switching control signal 18 to select one of antennas 1 to 4 to another antenna successively for consecutive four horizontal synchronizing cycles (each between horizontal synchronizing pulses) to detect peak levels during these four horizontal retrace periods. However, one antenna of antennas 1 to 4 which has been selected previously is used for receiving the television signal during horizontal scanning periods following the horizontal retrace periods. Then, the peak level detection circuit 8 detects and holds peak levels of horizontal synchronizing pulses during these consecutive horizontal retrace (blanking) periods. Then, during the following horizontal scanning period, the comparing circuit 7 compares these peak levels, derived from respective antennas 1 to 4, detected during consecutive horizontal retrace periods and supplies the comparing result indicative of which antenna provides a largest peak level of the horizontal synchronizing signal. Then, the control circuit 9a controls the antenna switching circuit 6 to select one of antennas providing the largest peak level of the horizontal synchronizing signal in accordance with the comparing result of the comparing circuit 7 in response to the following horizontal synchronizing signal and holds this condition for a predetermined number M of horizontal scanning periods.

FIG. 3 is a diagram of a time chart of the first embodiment. The control circuit 9a selects one of antennas 1 to 4 in response to the vertical and horizontal synchronizing signals 13 and 14 at the start of the horizontal retrace period. At the end of the horizontal retrace period the control circuit 9a selects the antenna used before the start of the horizontal retrace period by controlling the antenna switching circuit 6 through the antenna control signal 18. That is, in FIG. 3, the control circuit 9a switches antenna coupled to the television receiver 10 from the antenna 2 to the antenna 1 in response to the vertical and horizontal synchronizing signals 13 and 14 at the start (t1) of the horizontal retrace period. At the end (t2) of the horizontal retrace period the control circuit 9 switches the antenna from antenna 1 to the antenna 2 again which is used before the start (t1) of the horizontal retrace period by controlling the antenna switching circuit 6 through the antenna control signal 18.

The control circuit 9a effects this operation to all other antennas. That is, the peak level of the horizontal synchronizing signal derived from the antenna 2 is detected from a timing t3 to a timing t4 and held therein, the peak level of the horizontal synchronizing signal derived from the antenna 3 is detected from a timing t5 to a timing t6 and held therein, the peak level of the horizontal synchronizing signal derived from the antenna 3 is detected from a timing t5 to a timing t6 and held therein, and the peak level of the horizontal synchronizing signal derived from the antenna 4 is detected from a timing t7 to a timing t8 and held therein. After all peak levels from antennas 1 to 4 have been detected, the control circuit 9a supplies a level comparing control signal 16 during a horizontal scanning period at t9 to t10. The comparing circuit 7 compares the peak levels of the horizontal synchronizing signal held therein each other and supplies the comparing result 17 indicative of the antenna providing the largest peak level to the control circuit 9a.

The the control circuit 9a selects the antenna 4 providing a largest peak level at a timing t11 by supplying the antenna selection signal 18 to the antenna switching circuit 6 to select the antenna 4 during the horizontal retrace period. The control circuit 9a holds this condition for N horizontal scanning periods following this antenna selection operation and then, repeats the antenna selection operation again. More specifically, this antenna selection operation is performed more than a several times for one vertical synchronizing period. There are 262.5 horizontal scanning lines for one vertical synchronizing period, so that the number Nf of detection and comparing operation of the peak level per the vertical synchronizing period is given by $$Nf=262.5/(N+\text{the number of antennas})$$

Therefore, if the number of the antenna is four, the number N of the horizontal scanning is less than 127, the number Nf of detection and comparing operation of the peak level per the vertical synchronizing period is more than one.

As mentioned above, according to this embodiment, there is substantially no affection of the switching of the antennas to the reproduced image. Moreover, the selection of the antenna providing a largest gain of the received video signal several times per one vertical scanning period. Therefore, if a vehicle running at a high speed and the receiving of the radio wave television signal is subjected to an affection of a phasing having a short interval, this diversity receiving apparatus provides a stable receiving condition in which a disturbance of the reproduced picture image is little.

In this embodiment, the peak level is effected to the video signal from the video receiving circuit 20 in the television receiver 10. However, it is also possible that the (peak) level detection is effected to the intermediate frequency signal 22 in the channel selection tuning circuit 19. Moreover, in this embodiment, the gain of each antenna is detected by the detecting the peak level of the horizontal synchronizing signal. However, it is also possible that the gain of each antenna is detected from other signals included in the composite video signal, intermediate frequency signal, or the received television radio wave signal.

Figure 4A:
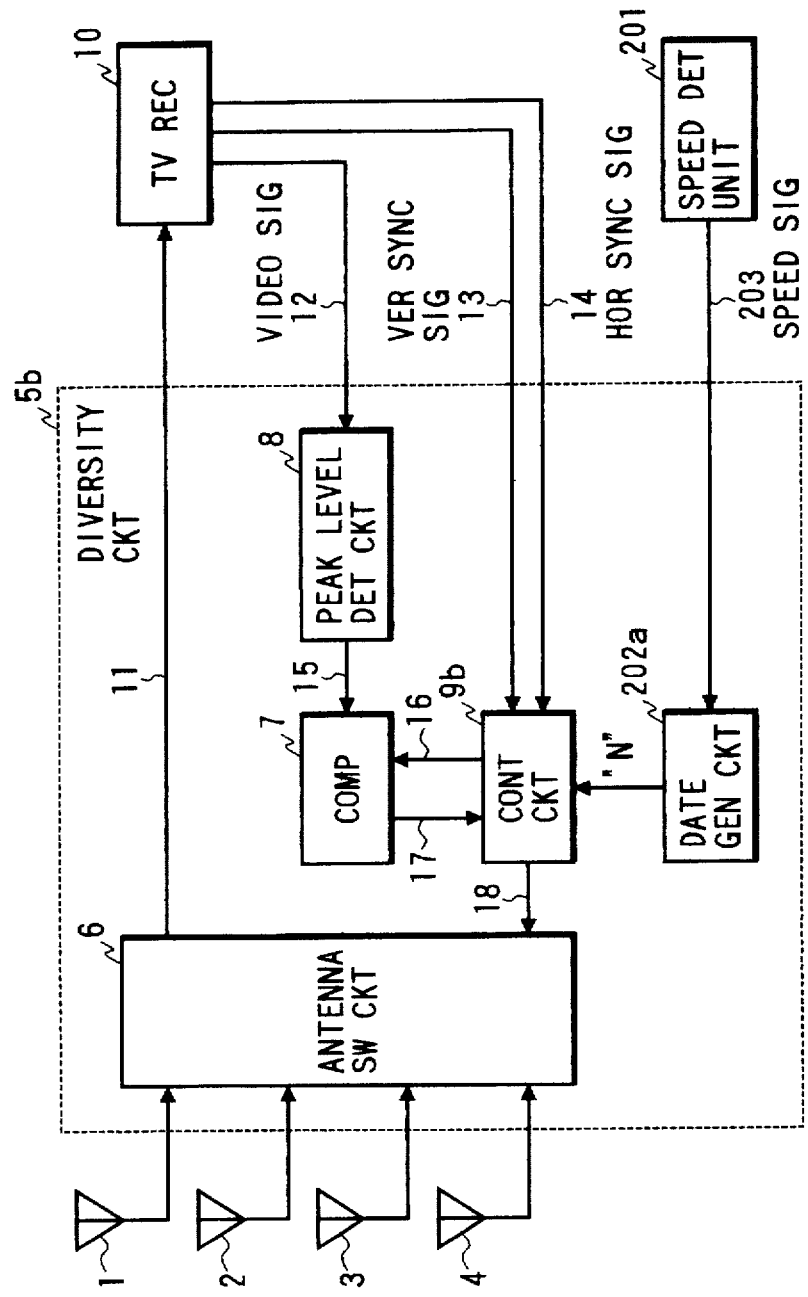
FIG. 4A is a block diagram of a diversity receiving apparatus of a second embodiment.

A second embodiment with be described. FIG. 4A is a block diagram of a diversity receiving apparatus of the second embodiment.

The diversity receiving apparatus of the second embodiment has substantially the same structure as the first embodiment. A difference between the first and second embodiments is in that a speed detection unit 201 for detecting a speed of the vehicle to which this diversity receiving apparatus is provided and a data generation circuit 202a for supplying data indicative of the number N of horizontal scanning periods for which the receiving condition is held in accordance with the speed signal are further provided. The control circuit 9b is further supplied with the data "N" indicative of the number of horizontal scanning periods for which the receiving condition is held and performs the antenna selection operation every N horizontal scanning cycles.

The speed detection unit 201 detects a speed of the vehicle to which this diversity receiving apparatus is provided and a data generation circuit 202a generates data indicative of the number N of horizontal scanning periods for which the receiving condition is held in accordance with the speed signal. The control circuit 9b performs the antenna selection operation for consecutive horizontal retrace periods corresponding to the number of antennas and holds this receiving condition in which one of antenna providing a largest gain of the antenna is selected for the following N horizontal scanning cycles.

Therefore, with increase in the speed of the vehicle, the antenna selection interval shorted.

With increase in the speed of the vehicle, a variation period of phasing affection to the television receiving becomes shorter. Therefore, in order to receive the radio wave television signal subjected to such phasing, the number of the horizontal scanning cycles for which the selected antenna is continuously used per once antenna section operation should be reduced in accordance with the speed of the vehicle. The data generation circuit 202 supplies the data indicative of the number N of the horizontal scanning periods for which the selected antenna is continuously used per once antenna section operation.

Figure 5A:
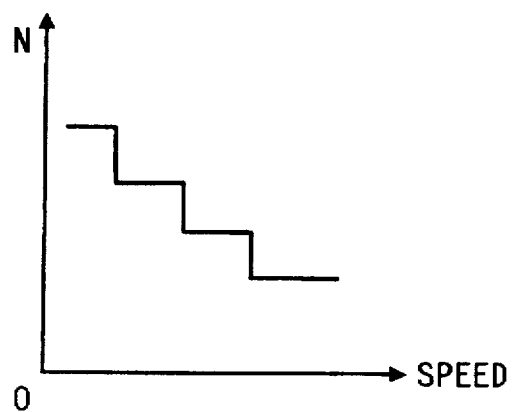
FIGS. 5A and 5B are graphic diagrams of the second embodiment.
Figure 5B:
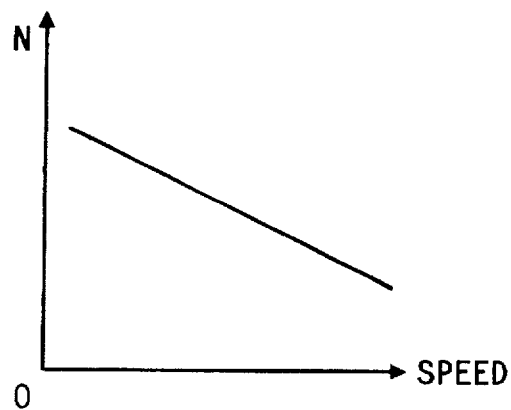

That is, the data generation circuit 202 has a set of threshold levels and comparing the speed signal with the threshold levels and generates the data corresponding to the number N of the horizontal scanning periods for which the selected antenna is continuously used per once antenna section operation. Therefore, the control circuit 9b performs the antenna selection operation for horizontal scanning periods corresponding to the number of antennas and holds this receiving condition in which the selected antenna is used for the following N horizontal scanning cycles. This number of horizontal scanning cycles is reduced in accordance with the speed of the vehicle. FIGS. 5A and 5B are graphic diagrams of the second embodiment showing relations between the variation of the number N of the horizontal scanning periods for which the selected antenna is continuously used per once antenna section operation and the speed of the vehicle. In FIG. 5A, the number N of the horizontal scanning periods for which the selected antenna is continuously used per once antenna section operation varies with the speed of the vehicle stepwise. On the other hand, in FIG. 5B, the number N of the horizontal scanning periods for which the selected antenna is continuously used per once antenna section operation varies with the speed of the vehicle continuously.

In the diversity receiving apparatus of this embodiment, when the vehicle stops or runs at a low speed, the radio wave television signal is subjected to phasing having a relatively long period. Therefore, the antenna selection operation is executed every several fields to provide a stable receiving condition. When the vehicle runs at a high speed, the antenna selection should be performed several times per one vertical scanning period to provide a stable receiving condition. Thus, the period of selection of antennas is varied with the change in the phasing condition due to the movement of the vehicle. Accordingly, the frequency of antenna selection operation is reduced, so that unnecessary switching of antenna is reduced at a low speed. Thus, the generation of switching noise accompanied with the switching of antennas appearing in the reproduced sound is prevented as well as a stable receiving condition is provided at a high speed.

Figure 4B:
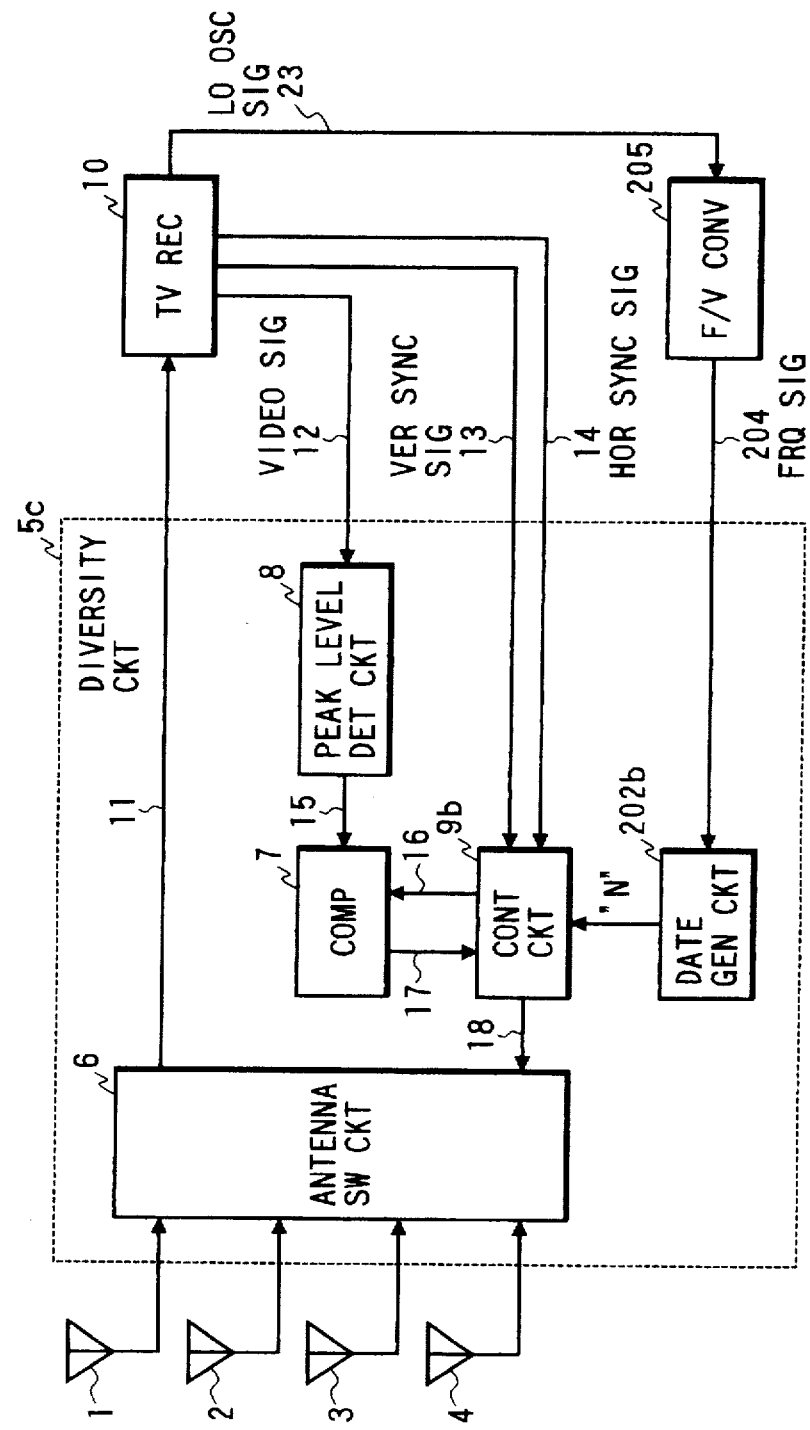
FIG. 4B is a block diagram of a first modification of the second embodiment.

FIG. 4B is a block diagram of a first modification of the second embodiment. The basic structure and the basic operation is similar to the second embodiment shown in FIG. 4A. The difference is in that the data indicative of the number N of the horizontal scanning periods for which the selected antenna is continuously used per once antenna section operation is generated by the data generation circuit 202b and a frequency/voltage converter 205. That is, the local oscillation signal 23 is supplied to the frequency/voltage converter 205 which converts the frequency of the local oscillator in the channel selection tuning circuit 19 to a voltage of a frequency signal 204 and then, the data generation circuit 202b generates the data indicative of the number N of the horizontal scanning periods for which the selected antenna is continuously used per once antenna selection in accordance with the frequency signal 204.

Therefore, the number N of the horizontal scanning cycles for which the selected antenna is continuously used per once antenna selection is determined in accordance with the frequency of the received radio wave television signal. The variation period of phasing is varied with increase in the frequency of the received television radio wave signal. Therefore, the number N of the horizontal scanning cycles for which the selected antenna is continuously used per once antenna selection is decreased continuously or stepwise with increase in the frequency of the received radio wave television signal.

Figure 4C:
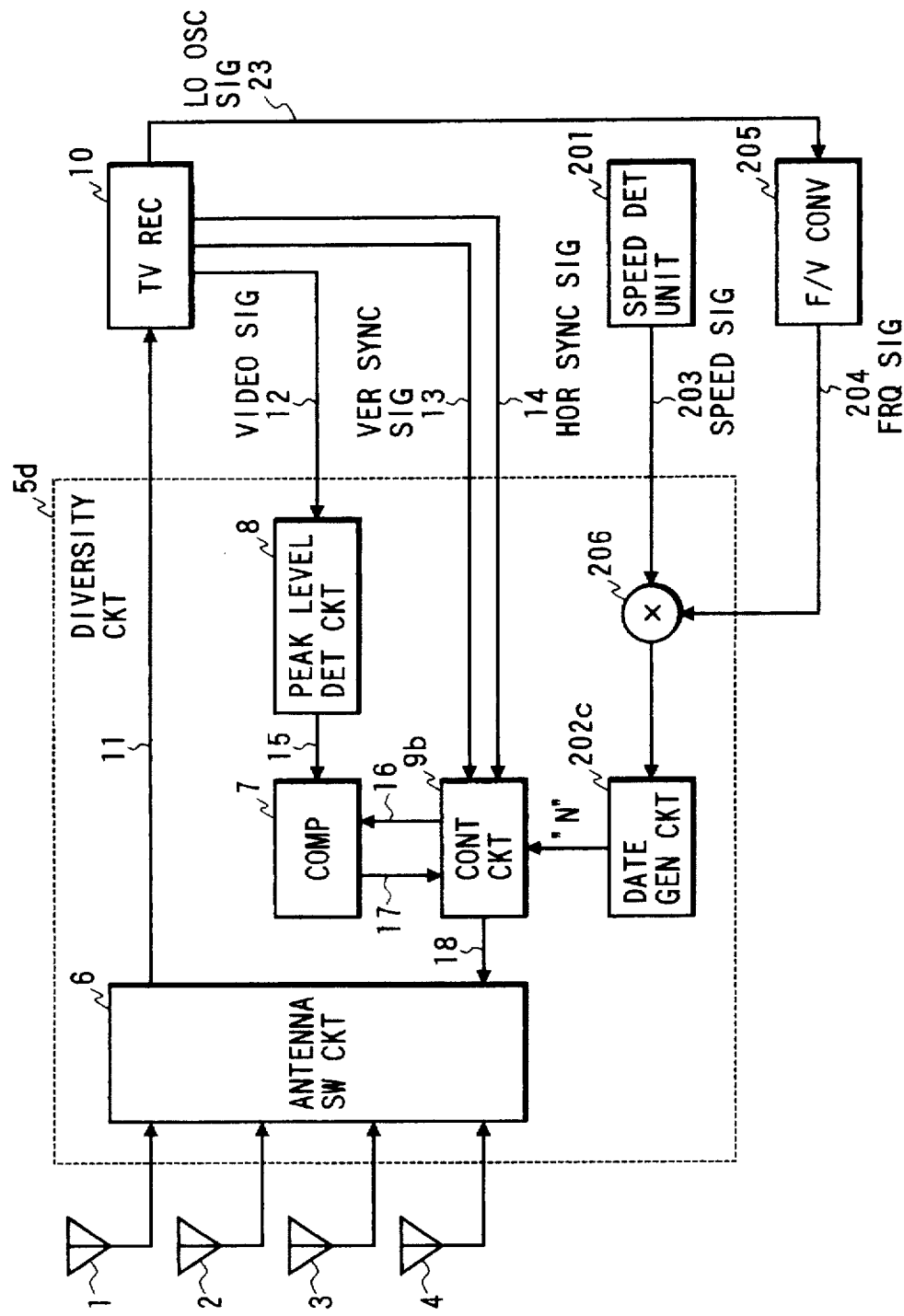
FIG. 4C is a block diagram of a second modification of the second embodiment.

FIG. 4C is a block diagram of a second modification of the second embodiment. The basic structure and the basic operation is similar to the second embodiment and the first modification shown in FIGS. 4A and 4B. That is, the second modification is a combination of the second embodiment shown in FIG. 4A and the first modification. The data indicative of the number N of the horizontal scanning periods for which the selected antenna is generated in accordance with a product of the speed signal 203 and the frequency signal 204 using a multiplier 206. That is, the the number N of the horizontal scanning periods for which the selected antenna is continuously used per once antenna selection is decreased continuously or stepwise with increase in the frequency of the received television radio wave signal. Therefore, the period of selecting an optimum antenna can be adaptively changed in accordance with the phasing condition, so that the receiving condition of the television radio wave signal is made stable.

Figure 6:
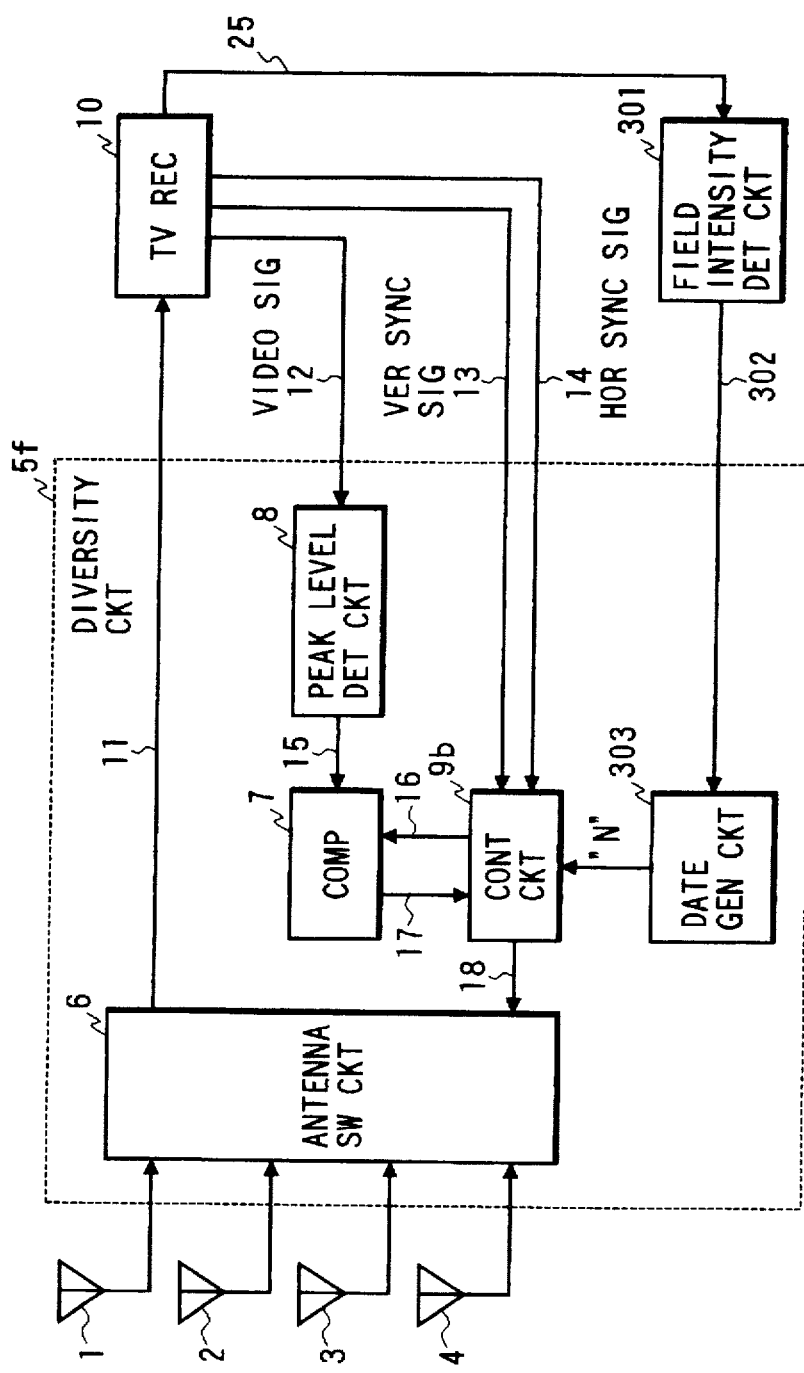
FIG. 6 is a block diagram of a diversity receiving apparatus of a third embodiment.

A third embodiment will be described. FIG. 6 is a block diagram of a diversity receiving apparatus of the third embodiment.

The diversity receiving apparatus of the third embodiment has substantially the same structure as the first embodiment. A difference between the first and third embodiments is in that a field intensity detection circuit 301 and a data generation circuit 303 are further provided.

Figure 2B:
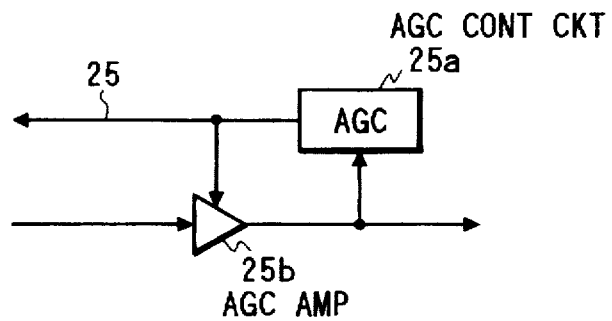
FIG. 2B is a block diagram of a automatic gain control amplifier used in the television receivers shown in FIGS. 1 and 15.

The field intensity detection circuit 301 detects a field intensity of the received radio wave television signal from an AGC signal 25 from the channel selection tuning circuit 19 of the television receiver 10. FIG. 2B is a block diagram of an AGC amplifier 25b. The AGC amplifier 25b amplifies the received radio wave television signal in accordance with the AGC signal generated by an AGC control circuit 25a. The AGC control circuit 25a generates the AGC control signal 25a in accordance with the output of the AGC amplifier 25. The data generation circuit 303 supplies data indicative of the number N of horizontal scanning periods for which the receiving condition is held in accordance with a field intensity detection signal. The control circuit 9b is further supplied with the data "N" indicative of the number of horizontal scanning periods for which the receiving condition is held and performs the antenna selection operation every N horizontal scanning periods.

The field intensity detection unit 301 detects a field of the received radio wave television signal and the data generation circuit 303 generates data indicative of the number N of horizontal scanning periods for which the receiving condition is held in accordance with the field intensity detection signal. The control circuit 9b performs the antenna selection operation for horizontal scanning cycles corresponding to the number of antennas and holds this receiving condition in which one of antenna providing a largest gain of the antenna is selected and holds this state for the following N horizontal scanning periods.

Figure 7:
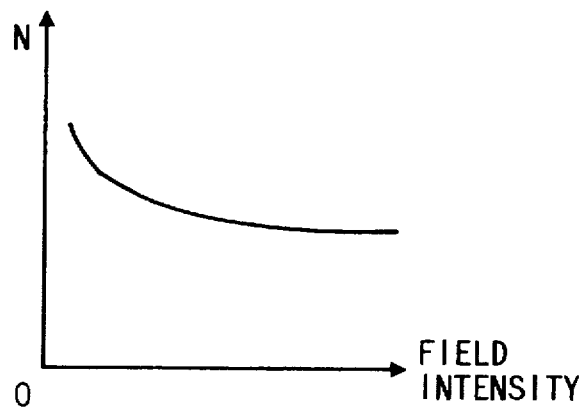
FIG. 7 is a graphic diagram showing relation between the variation of the number N of the horizontal scanning periods for which the selected antenna is continuously used per once antenna section operation and the field intensity.

Therefore, in a weak field intensity, an improvement of a picture quality cannot obtained by a frequent antenna selection operation. Contrary, a switching noise due to the selection operation of antennas appears in the reproduced sound. Therefore, with weakness in the field intensity, the number N of horizontal scanning periods for which the receiving condition is held is increased to reduce the occurrence of the switching noise due to the selection operation of the antenna in the reproduced sound. FIG. 7 is a graphic diagram showing relation between the variation of the number N of the horizontal scanning periods for which the selected antenna is continuously used per once antenna section operation and the field intensity. In FIG. 7, the number N of the horizontal scanning periods for which the selected antenna is continuously used per once antenna section operation varies with the speed of the vehicle continuously. However, the number N may change stepwise.

As mentioned above, according to this embodiment, with decrease in the field intensity at the antenna, a frequency of selection operation of antennas is decreased by increasing the number N of the horizontal scanning periods to prevent a deterioration in the reproduced sound due to the switching noise.

Figure 8:
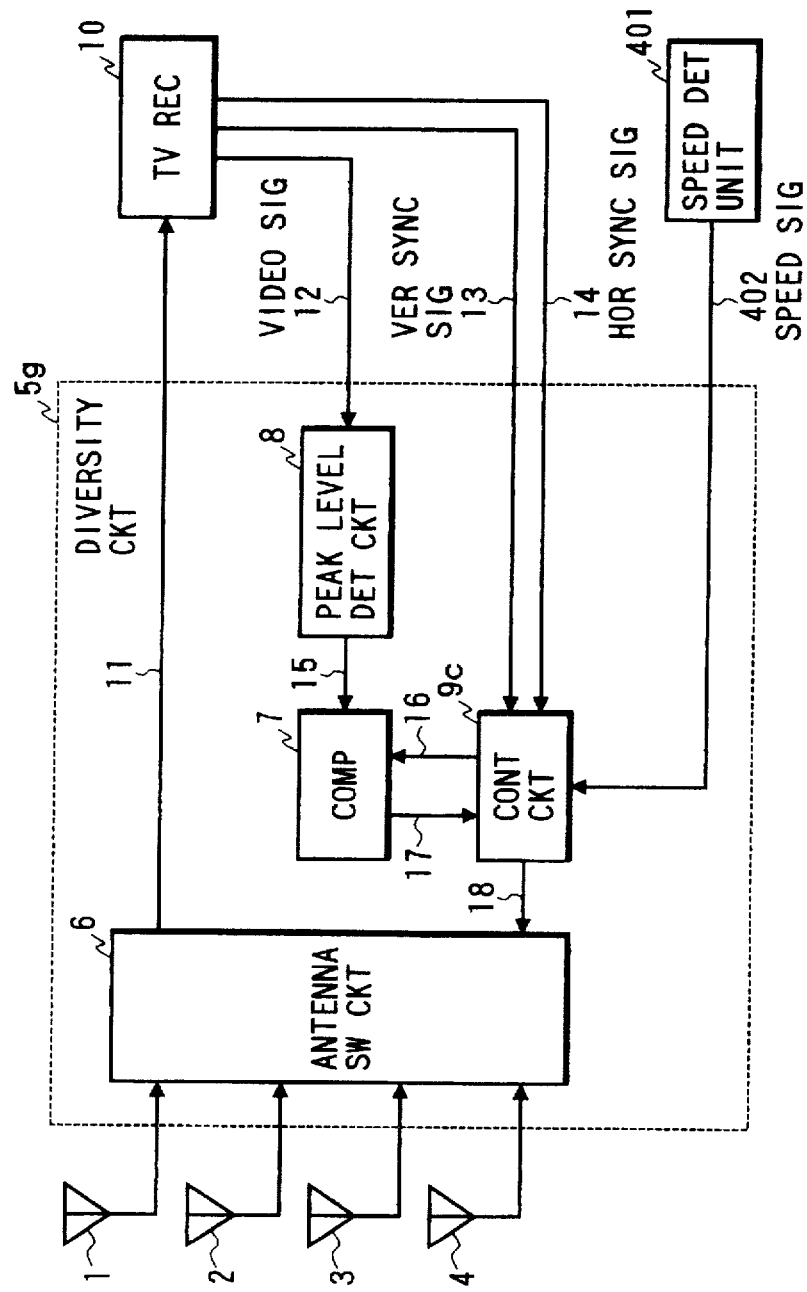
FIG. 8 is a block diagram of a diversity receiving apparatus of a fourth embodiment.

A fourth embodiment will be described. FIG. 8 is a block diagram of a diversity receiving apparatus of the fourth embodiment and FIGS. 9A and 9B are timing charts of the fourth embodiment.

The diversity receiving apparatus of the fourth embodiment has substantially the same structure as the first embodiment. A difference between the first and fourth embodiments is in that a speed detection unit 401 is further provided and a control circuit 9c is used in place of the control circuit 9a.

The speed detection unit 401 detects a speed of the vehicle to which this diversity receiving apparatus is provided and supplies a speed signal 402 to the control circuit 9b. The control circuit 9c generates the antenna selection control signal 18, the level detection timing signal and the level comparing control signal as shown in FIGS. 9A and 9B. FIG. 9A shows a peak detection and level comparing operations at kth level comparing operation (antenna selection operation) of peak levels when the speed of the vehicle decreases under a predetermined value at kth level comparing operation. For example, it is assumed the antenna 4 shows a smallest peak level when (k−1)th level comparing operation. The control circuit 9c stores first data indicating that the antenna showing the smallest peak level in a memory provided therein from Kth to (k+1)th comparing operation. Then, at kth level comparing operation, if the speed does not exceed the predetermined value, the control circuit 9c generates the antenna selection control signal of the antennas 1 to 3 but does not generates the antenna selection control signal for the antenna 4 during kth antenna selection operation and the peak level comparing operation is executed among the peak levels derived from the antennas 1 to 3 (except 4) and the control circuit 9c stores second data indicative of the decease in the speed in the memory provided therein until (k+1)th comparing operation. However, if at the kth comparing operation, the speed of the vehicle exceeds the predetermined value, the control circuit 9c generates the antenna selection control signals of antennas 1 to 4 and a level detection timing signal, and a level comparing control signal as similar to the first embodiment as shown in FIG. 3. Moreover, the control circuit 9c clears the first data and does not store the second data.

Then, if at kth and (k+1)th antenna selection operation, the speed of the vehicle does not exceed the predetermined value, the control circuit 9c generates the antenna selection control signals of antennas 1, 3, 4 (except 2) and the level detection timing signal, and the level comparing control signals as shown in FIG. 9B. Here, it is assumed that the peak level derived from the antenna 4 shows a smallest level at the (k−1)th antenna selection (level comparing) operation. That is, at the (k+1)th antenna selection operation, the comparing of the peak levels is executed with the peak level derived from the antenna 2 removed from the group of peak levels compared each other and a peak level derived from the antenna 4 which was removed from the group of peak levels compared each other at the kth antenna selection operation is added to the group.

As mentioned, when the vehicle runs at a low speed or stops and thus, the field intensity varies gradually, it is considered that a possibility that the antenna which showed a smallest peak level at the last antenna selection operation shows a largest peak level at the following antenna selection operation is extremely low. Therefore, the peak level derived from the antenna which showed the smallest peak value at the last antenna selection operation is removed from the group including peak levels compared each other at the following antenna selection operation because the variation in the field intensity or the phasing condition is extremely small. Therefore, the number of switching of antenna per one antenna selection operation is reduced so that the switching noises in the video and sound signal are reduced.

Figure 10:
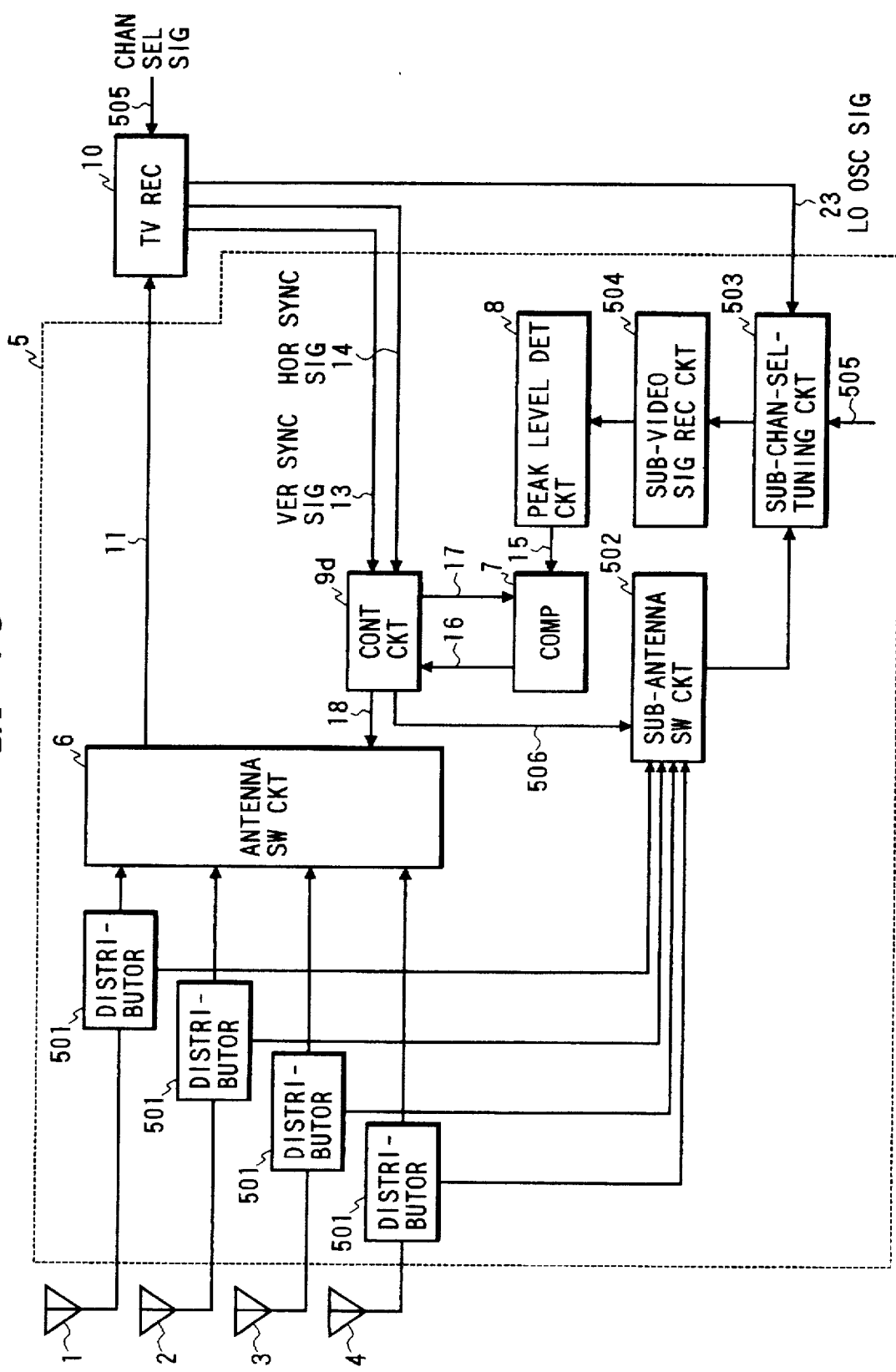
FIG. 10 is a block diagram of a diversity receiving apparatus of a fifth embodiment.

A fifth embodiment will be described. FIG. 10 is a block diagram of a diversity receiving apparatus of the fifth embodiment and FIG. 11 is a timing chart of the fifth embodiment.

The diversity receiving apparatus of the fifth embodiment has substantially the same structure as the first embodiment. The difference between the first and fifth embodiments is in that distributors 501, a sub-antenna switching circuit 502, sub-channel-selection-tuning circuit 503, and a sub-video signal receiving circuit 504 are further provided. The distributors 501 are provided between the antenna and the antenna switching circuit 6 respectively for supplying radio wave television signals received by respective antennas 1 to 4 to the antenna switching circuit 6 and the sub-antenna switching circuit 502. The sub-antenna switching circuit 502 selectively supplies a radio wave television signal from either of the antennas 1 to 4 to a sub-channel-selection-tuning circuit 503. The sub-channel-selection-tuning circuit 503 selects one channel of video signal in accordance with the channel selection signal 505 which is also supplied to the television receiver 10 to select one channel of the television signal. These distributors 501, a sub-antenna switching circuit 502, sub-channel-selection-tuning circuit 503, and a sub-video signal receiving circuit 504 are provided to eliminate the antenna selection switching operation for detecting one of antennas providing a largest peak level by the antenna switching circuit 6 supplying the video signal to be reproduced. That is, the antenna selection switching operation for detecting one of antennas providing a largest peak level is made only in the sub-antenna switching circuit 502. The switching in the antenna switching circuit 6 is made after the antenna to be selected has been determined.

The television radio wave signals received by the antennas 1 to 4 are distributed by the distributors 501 to the antenna switching circuit 6 and to the sub-antenna switching circuit 502. One of radio wave television signals is supplied to the sub-channel-selection tuning circuit 503. The sub-channel-selection tuning circuit 503 selects one channel of television signal in accordance with the channel section signal 505. That is, the sub-channel-selection tuning circuit 503 selects the channel corresponding to that selected in the television receiver 10 supplied with the same channel selection signal 505. The sub-channel-selection tuning circuit 503 supplies the selected television signal to the sub-video receiving circuit 504. The video signal receiving circuit 504 receives the sub-video signal of the selected channel and supplies the sub-video signal and vertical and horizontal synchronizing signals to the peak level detection circuit 8. The peak level detection circuit 8 detects peak levels of sub-video signal from respective antennas 1 to 4 selected by the sub-antenna switching circuit 502 and supplies the detected peak levels to the comparing circuit 7. The comparing circuit 7 compares the detected peak levels of horizontal synchronizing pulses each other and supplies the comparing result 16 to the control circuit 9d. The control circuit 9d determines one of antennas 1 to 4 providing a largest peak level in accordance with the comparing result 16 and operates the antenna switching circuit 6 to select the antenna providing the largest peak level. The control circuit 9d also controls the sub-antenna switching circuit 502 to successively selects one of antennas for horizontal retrace periods.

Figure 11:
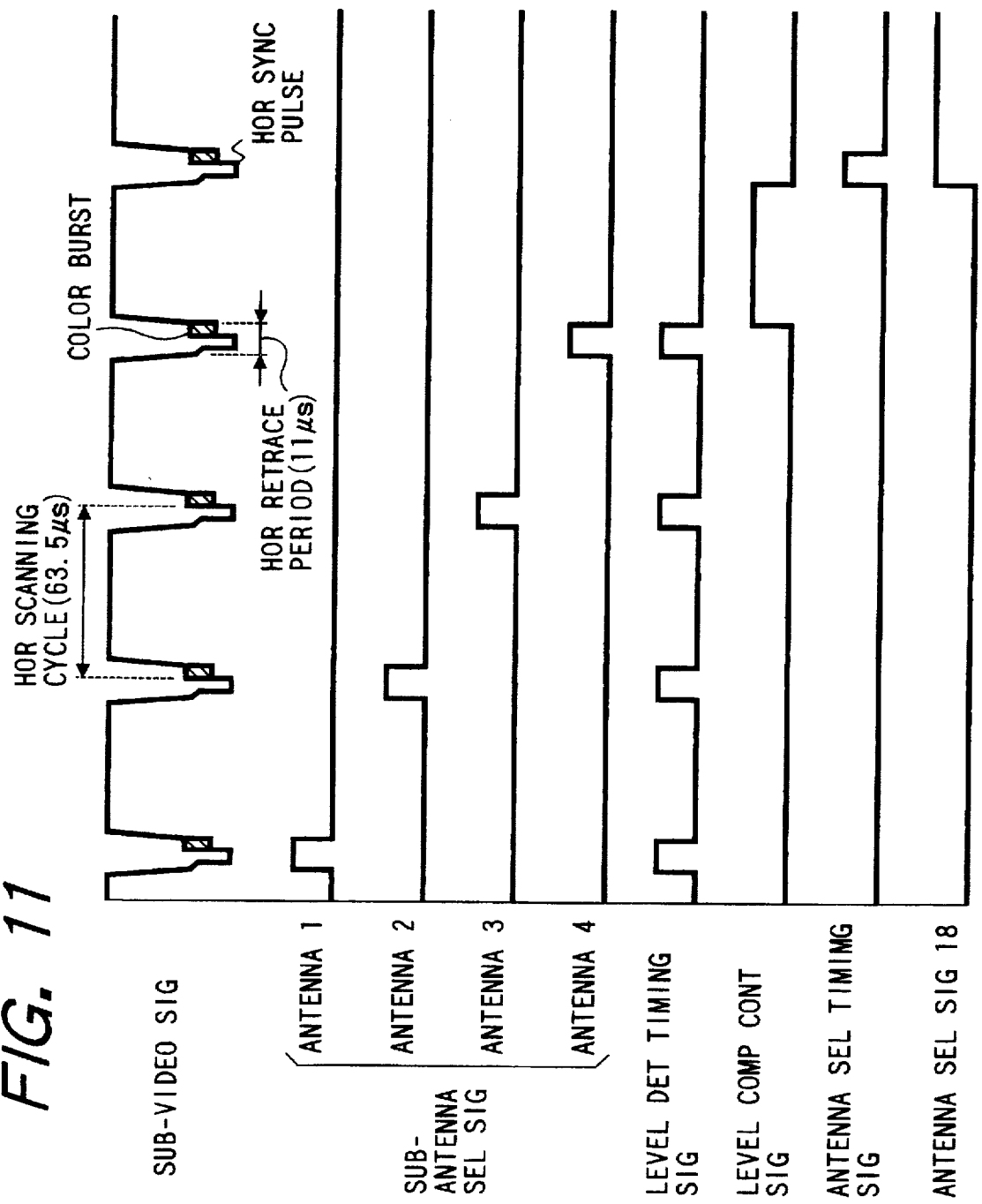
FIG. 11 is a timing chart of the fifth embodiment.

As shown in FIG. 11, the control circuit 9d successively selects one of antennas 1 to 4 to detects peak levels during horizontal synchronizing pulses during successive horizontal retrace periods by the peak level detection circuit 8 supplied with the sub-video signal of which channel is the same as the channel selected by the television receiver 10. During this peak level detection and peak level comparing operations, the antenna switching circuit 6 does not performs the selection operation. Then, during the horizontal retrace period after comparing operation, the control circuit 9d operates the antenna switching circuit 6 to select one of antennas providing the largest peak level of the horizontal synchronizing pulse.

As mentioned, it is not necessary to operate the switching circuit 6 during the peak level detection and peak level comparing operation, so that the affection of switching to the picture quality and the noise in the reproduced sound can be reduced.

In this embodiment, the sub-channel selection tuning circuit 503 is supplied with the channel selection signal 505 to select one channel. However, it is also possible to supply the local oscillation signal 25 supplied from the channel selection tuning circuit 19 in the television receiver 10 to select the same channel of television signal.

Moreover, in this embodiment, the peak level is detected from the output of the sub-video signal receiving circuit 504. However, it is also possible that the output of the sub-channel-selection tuning circuit 503 is used to detects the peak levels.

Figure 12:
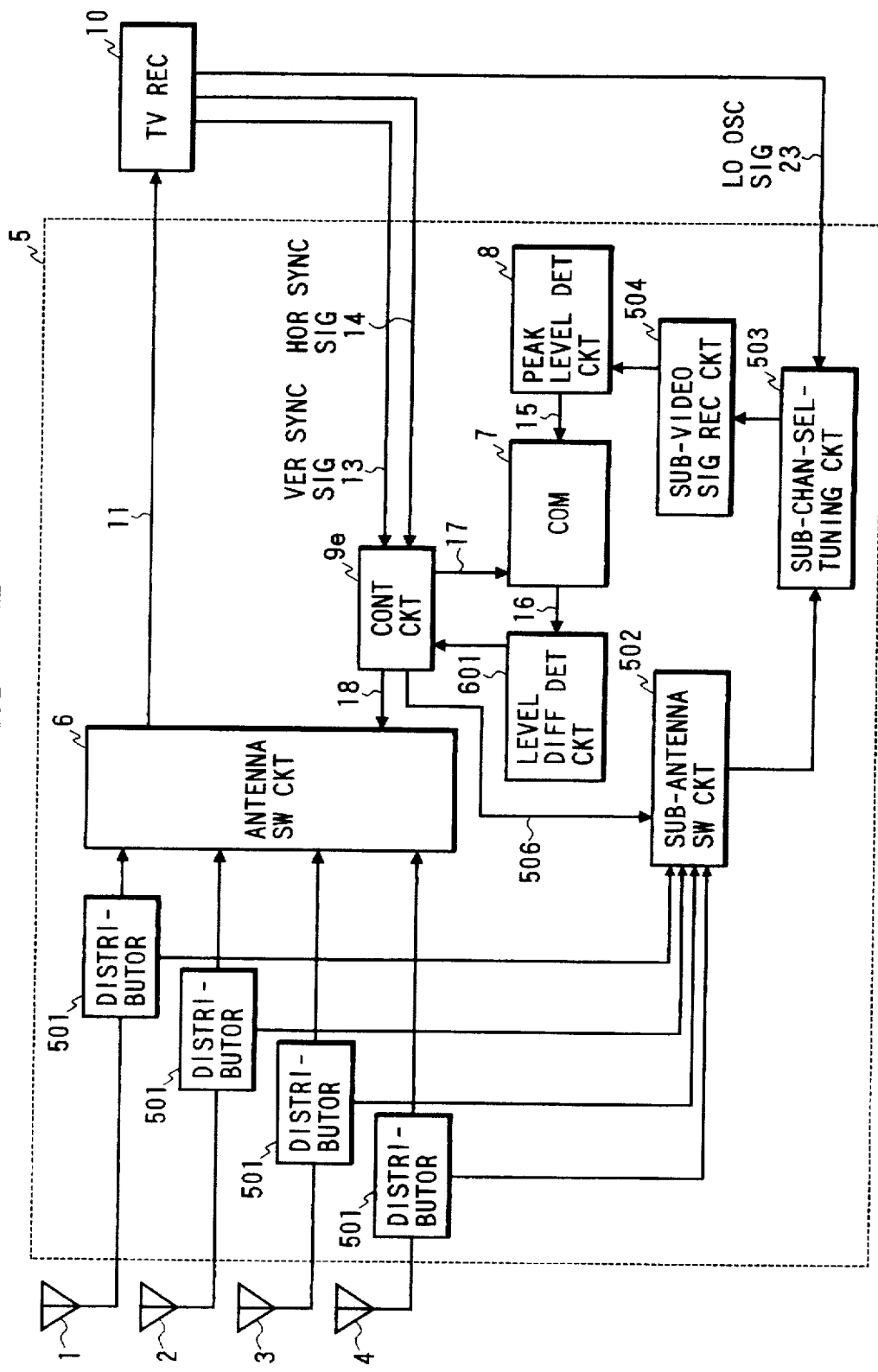
FIG. 12 is a block diagram of a diversity receiving apparatus of the sixth embodiment.

A sixth embodiment will be described. FIG. 12 is a block diagram of a diversity receiving apparatus of the sixth embodiment.

The diversity receiving apparatus of the sixth embodiment has substantially the same structure as the diversity receiving apparatus of the fifth embodiment. The difference between the fifth and sixth embodiments is in that a level difference detection circuit 601 is further provided.

The level difference detection circuit 601 detects level difference between the current peak level derived from the antenna selected by the antenna switching circuit 6 at the last antenna selection operation and the peak levels derived from other antennas and when any of the differences is larger than a predetermined value the switching of antennas is made. Therefore, the frequency of selecting of antenna is reduced.

Moreover, this structure is applicable to the first embodiment. That is, the level difference detection circuit 601 is provided such that it is coupled to the comparing circuit 7 and the control circuit 9a. Therefore, the frequency of selecting of antenna is also reduced.

Figure 13:
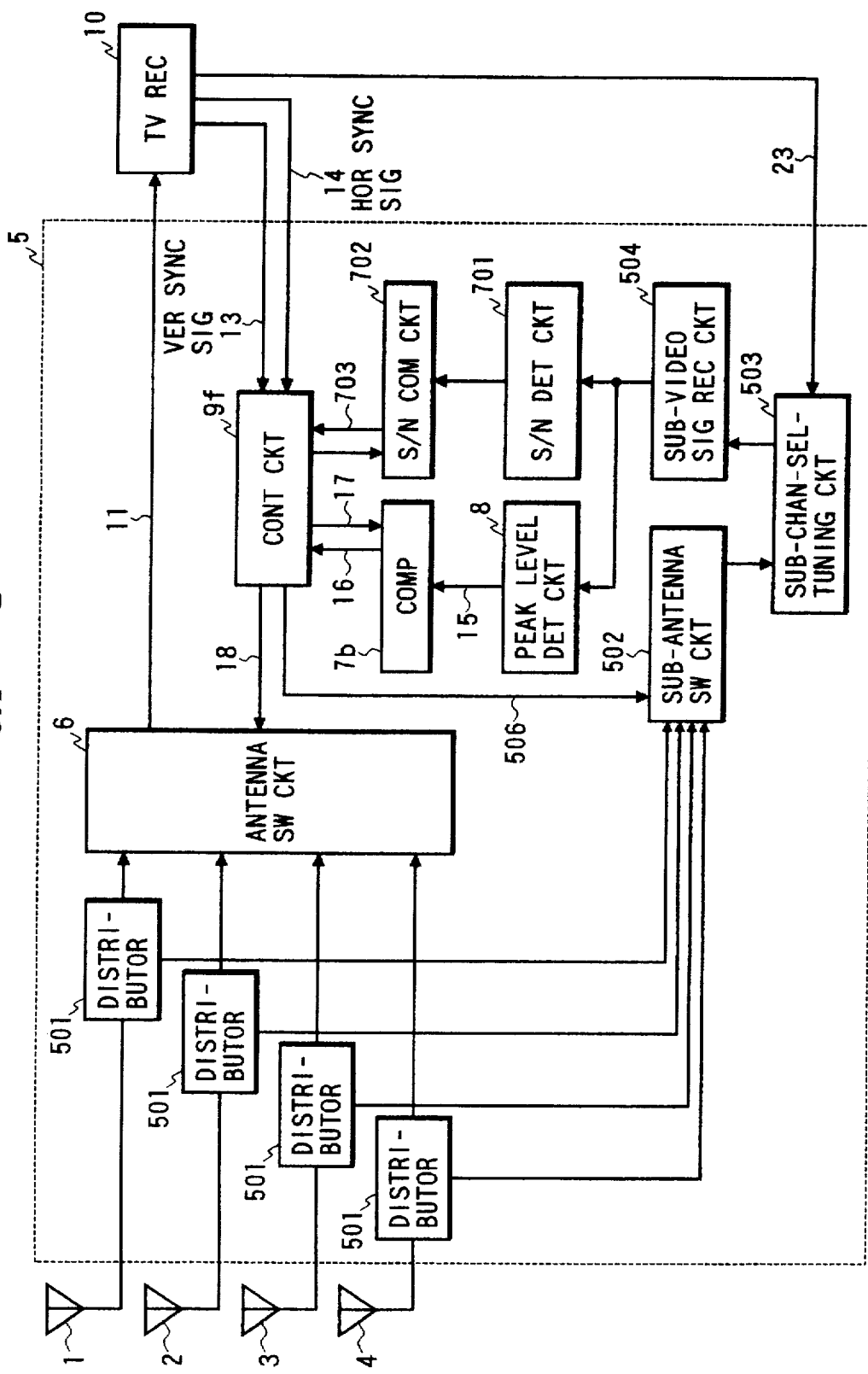
FIG. 13 is a block diagram of a diversity receiving apparatus of a seventh embodiment.

A seventh embodiment will be described. FIG. 13 is a block diagram of a diversity receiving apparatus of the seventh embodiment.

The diversity receiving apparatus of the seventh embodiment has substantially the same structure as the fifth embodiment. The difference between the fifth and seventh embodiment is in that a signal-to-noise (S/N) ratio detection circuit 701 and signal-to-noise ratio comparing circuit 702 are further provided.

The signal-to-noise ratio detection circuit 701 detects and holds a S/N ratio from a signal having a predetermined amplitude included in the sub-video signal during a vertical retrace period from the sub-video signal receiving circuit 504. The S/N ratio comparing circuit 702 compares the held S/N ratio values from the S/N ratio detection circuit 701 each other in response to a S/N comparing control signal 703 from the control circuit 9f. The control circuit 9f operates the sub-antenna switching circuit 502 to successively select each of antenna through the sub-antenna switching control signal 506 and supplies S/N comparing control signal 703 to compare the S/N detection results derived form the respective antennas. On the other hand, the peak level detection circuit 8 detects and holds peak levels of the horizontal synchronizing pluses and the comparing circuit 7b compares the peak levels derived from respective antennas each other and detects differences in peak level between the previously selected antenna and other antennas. If the difference is smaller than a reference value, the control circuit 9f selects one of antennas which shows a highest S/N ratio from the S/N comparing result from the S/N comparing circuit 702 and generates the antenna switching control signal 18 to select the antenna showing the highest S/N ratio.

Figure 14:
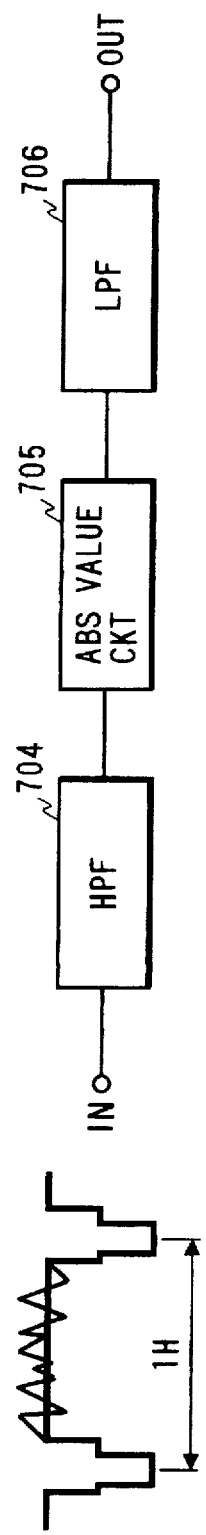
FIG. 14 is a block diagram of the S/N ratio detection circuit shown in FIG. 13.

FIG. 14 is a block diagram of the S/N ratio detection circuit 701 for example. The S/N ratio detection circuit 701 comprises a high pass filter 704, an absolute value circuit 705, and a low pass filter 706.

The high pass filter 704 is supplied with the sub-video signal from the sub-video signal receiving circuit 504 and cuts a dc component in a signal having a predetermined amplitude included in the sub-video signal for vertical retrace periods to extract an amplitude variation component. The absolute value circuit 705 obtains an absolute value from an output of the high pass filter 704 to convert the variation component having plus and minus values to a positive value. The low pass filter 706 outputs a value proportional to a total of absolute values of the variation component.

As mentioned above, the selection of the antennas is effected in accordance with the S/N ratio when peak levels are within a predetermined level, so that it is possible to select an antenna providing a reproduced picture image having little pulse noise or little ghost. Moreover, the selection operation of the antenna is effected through switching of antennas using the sub-antenna switching circuit 502, so that there is almost no affection to the picture quality and the reproduced sound quality.

According the embodiments mentioned above, the antenna selection is performed by switching a plurality of antennas successively to detects peak levels of horizontal synchronizing pulses derived from respective antennas during successive retrace periods from reproduced video signals, so that the optimum antenna is selected. Therefore, if the received electric field is subjected to a high speed phasing, a stable receiving condition can be provided. Moreover, a period of the antenna selection operation can be controlled in accordance with a speed of the vehicle to which this diversity receiving apparatus is provided, a frequency of received television radio wave signal, or a field intensity or the like, so that the antenna selection can be performed in accordance with the received field condition. Moreover, the sub-antenna switching circuit and sub-channel selection tuning circuit are provided, so that the switching noise appearing on the reproduced picture or a reproduced sound due to the switching operation for detecting respective peak levels derived from respective antennas can be essentially eliminated. Moreover, the S/N detection circuit and the S/N comparing circuit are further provided, so that an antenna providing a little amount of ghost and a little amount of pulse noise can be selected as well as the antenna provides a high field intensity.

Figure 15:
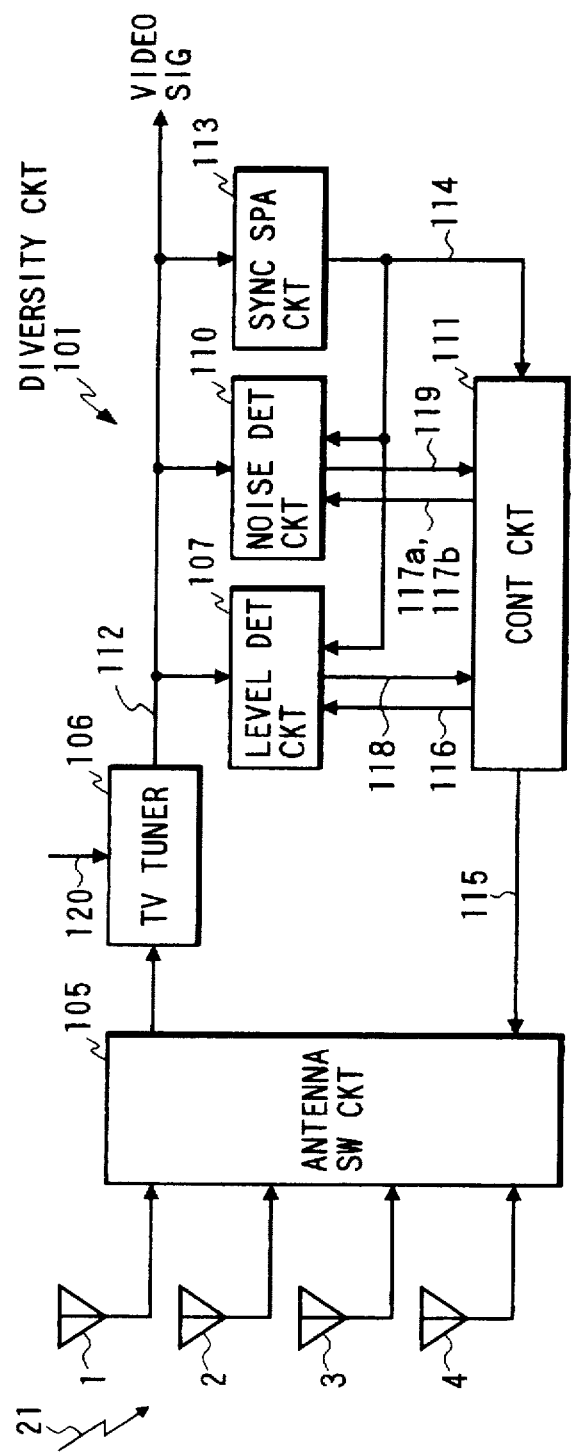
FIG. 15 is a block diagram of a diversity receiving apparatus of a seventh embodiment.

A seventh embodiment will be described. FIG. 15 is a block diagram of a diversity receiving apparatus of the seventh embodiment.

The diversity receiving apparatus with antenna switching of the seventh embodiment, provided to a vehicle (not shown), for receiving a television signal, comprises antennas 1 to 4, mounted on the vehicle, for receiving a television radio wave signal 21, a diversity circuit 101 for receiving a television signal with suitable one of antennas 1 to 4 and outputting a composite video signal.

The diversity circuit 101 comprises an antenna switching circuit 105 for selectively supplying one of outputs of the antennas 1 to 4, a television tuner 106 for effecting a tuning to select one channel of television signal from an output of the antenna switching circuit 6 and for supplying a composite video signal 112, a synchronizing signal separation circuit 113 for separating synchronizing signal 114, a level detection circuit 107 for detecting a level of the video signal 112 and generating a level detection result 118 in response to a level detection timing signal 116, a noise detection circuit 110 for detecting a noise level in the video signal and determining an S/N (signal to noise) ratio and generating a noise detection result 119 in response to a reset signal 117 and a sampling signal 117b, and a control circuit 111 for supplying an antenna selection control signal 115 to the antenna switching circuit 105 in accordance with the level detection result 118 and the noise detection result 119 in response to the synchronizing signal 114. The control circuit 111 operates the antenna switching circuit 105 and the level detection circuit 107 to detect levels of the video signal derived from respective antennas 1 to 4 in response to the synchronizing signal 114 and operates the antenna switching circuit 105 and the noise detection circuit 110 to detect noise components in the video signal derived from some of antennas 1 to 4 in response to the synchronizing signal 114.

The respective antennas 1 to 4 receive the television radio wave signal 21. The antenna switching circuit 105 selectively supplying one of outputs of the antennas 1 to 4 to the television tuner 106. The television tuner 106 effects a tuning to select one channel of television signal from an output of the antenna switching circuit 6 in accordance with a channel selection control signal 120 and supplies the composite video signal 112 to the level detection circuit 107, the noise detection circuit 110, and the synchronizing signal separation circuit 113 and externally outputs the video signal 112. The synchronizing signal separation circuit 113 separates the synchronizing signal 114 from the video signal 112.

Figure 16:
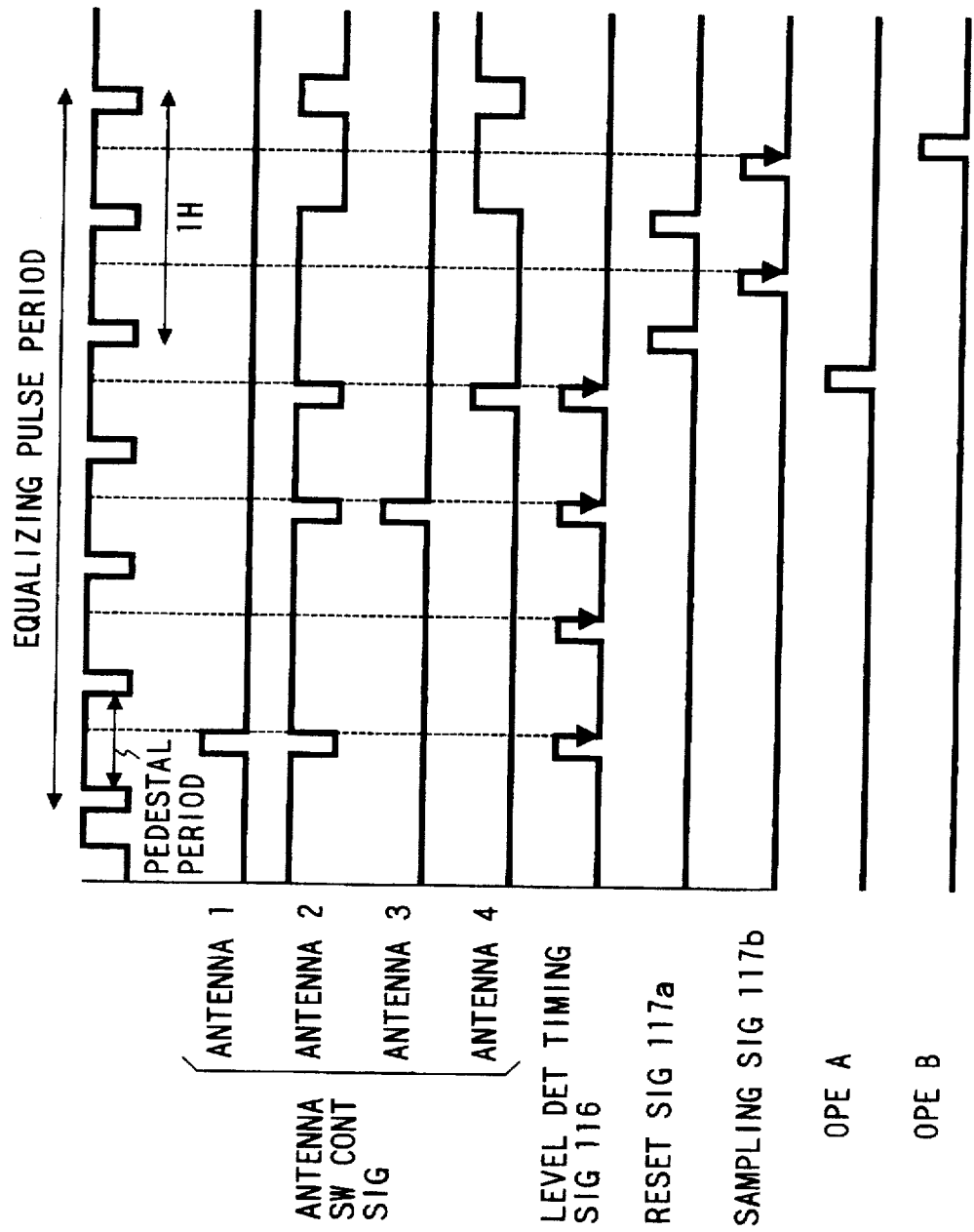
FIG. 16 is a timing chart of the seventh embodiment.

FIG. 16 is a timing chart of the seventh embodiment. This example shows the case where the antenna 2 is switched to the antenna 4 for example. The control circuit 111 comprises a microprocessor for executing processing and controlling the antenna switching circuit 105, the level detection circuit, and the noise detection circuit 110 as shown in FIG. 16 in response the synchronizing signal 114. The level detection circuit 107 detects a level of the video signal 112 and generates a level detection result 118 in response to the level detection timing signal 116 from the control circuit 111. More specifically, the level detection circuit 107 detects the level of the video signal at a middle of pedestal period of an equalizing pulse period for a several to a ten microseconds every a predetermined interval, for example, a half of a horizontal scanning period (½ H). During this operation, the control circuit 111 operates the antenna switching circuit through the antenna switching control signal 115 to select one of antennas 1 to 4 successively, so that levels of the video signal derived from respective antennas 1 to 4 are obtained and supplied to the control circuit 111 as the level detection result 118.

Then, the control circuit 111 execute an operation A. That is, the control circuit 111 determines one of antennas 1 to 4 providing a largest detected level except the antenna which has been selected at the last antenna selection operation (previously selected antenna) by comparing the levels of the video signal derived from the antennas except the previously selected antenna. Then, the control circuit determines the antenna (4) providing the largest level except the previously selected antenna (2) and the previously selected antenna as a target antenna of which noise level is to be measured.

The control circuit 11 supplies the reset signal 117a to the noise detection circuit 110 and the antenna switching control signal 115 to the antenna switching circuit 105 to select the antenna 2 and then, supplies the sampling signal 117b to the noise detection circuit 110 at the middle of the pedestal period to measure an amount of noise component derived from the antenna 2. Then, the control circuit 11 supplies the reset signal 117a to the noise detection circuit 110 again and the antenna switching control signal 115 to the antenna switching circuit 105 to select the antenna 4 and then, supplies the sampling signal 117b to the noise detection circuit 110 at the middle of the following pedestal period to measure an amount of noise components derived from the antenna 4.

Then, the control circuit 111 executes an operation B. That is, the control circuit 111 compares the amounts of noise components derived from the previously selected antenna 2 and the target antenna 4 and selects the target antenna (4) showing a smaller amount of noise component. In this example, the antenna 4 provides a smaller amount of noise components, so that the antenna 4 is selected in this antenna selection operation. Therefore, the control circuit 111 operates the antenna switching circuit 105 to select the antenna 4 and holds this state for the following vertical scanning period until the next antenna selection operation (vertical retrace period) and stores the data indicative of the selected antenna 4 used in the operation B.

Figure 17:
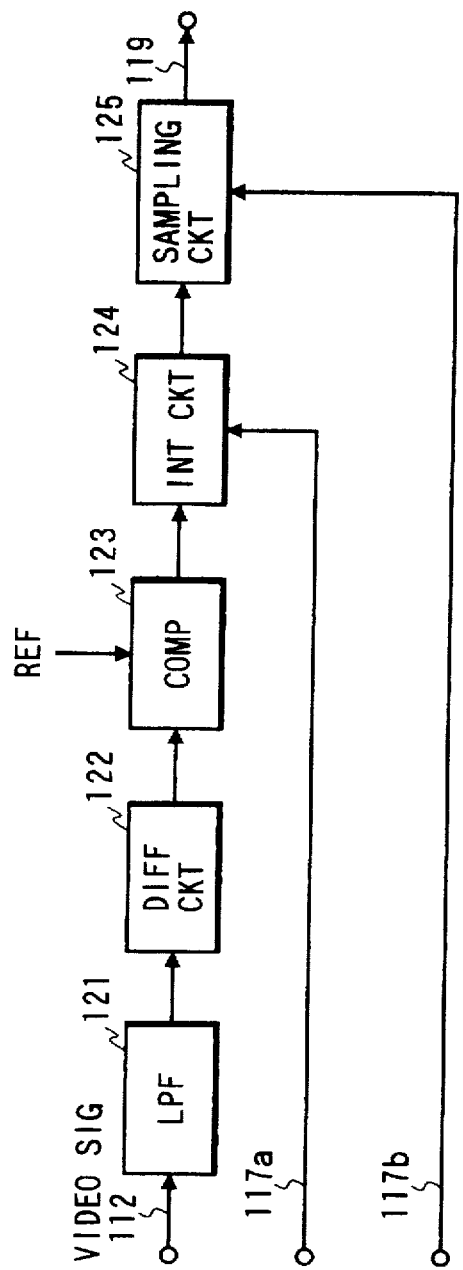
FIG. 17 is a a partial block diagram of the noise detection circuit shown in FIG. 15.

FIG. 17 is a a partial block diagram of the noise detection circuit 110 shown in FIG. 15. The noise detection circuit 110 comprises a low pass filter 121 for low-pass-filtering the video signal 112 to remove high frequency components which are unnecessary for detecting this noise detection operation, a differential circuit 122 for differentiating an output of the low pass filter 121, a comparing circuit 123 for comparing an output of the differential circuit 122 with a reference level, an integrating circuit 124 for integrating an output of the comparing circuit 123 in response to a reset signal 117a, a sampling circuit 125 for sampling an output of the integrating circuit 124 in response to the sampling signal 117b.

The low pass filter 121 has a cut off frequency selected from 0.5 to 2 MHz for example to remove high frequency components which are unnecessary for detecting this noise detection operation. The differential circuit 122 differentiates the output of the low pass filter 121. The comparing circuit 123 compares the output of the differential circuit 122 with the reference level and supplies a logic H level. The sensitivity to the noise component can be adjusted with the value of the reference level. The integrating circuit 124 is reset by the reset signal 117a and starts of integration in response to the logic H level of the output of the comparing circuit 123. The sampling circuit 125 samples the output of the integrating circuit 124 in response to the sampling signal 117b and supplies the sampling result 119 to the control circuit 111. That is, the integrating circuit 124 starts integration in response to the equalizing pulse and accumulates the noise component having a magnitude larger than the reference level and the sampling circuit 125 samples the accumulated noise component amount to the middle of the pedestal period and supplied the noise detection result to the control circuit 111.

In this embodiment, the integrating circuit 124 is used. However, a counting circuit for counting the pulses from the comparing circuit can be used in place of the integrating circuit 124. Such a counting circuit is reset by the reset signal 117a and outputs the count value to the sampling circuit 125.

In this embodiment, the noise detection of the selected antenna 2 is effected before that for another target antenna 4. However, this order can be inverted.

As mentioned above, in this embodiment, the antenna selection is made in accordance with the level of the received television signal as well as the amount of noise components, so that a reproduced picture image having less disturbance due to the noise components is provided.

Moreover, if a ghost of the equalizing pulse in the vertical retrace period appears the pedestal period, the ghost is detected as a noise component. Therefore, the noise detection circuit 110 also detects the ghost in the video signal, so that this diversity receiving circuit can provided a video signal having a little amount of ghost even at a city zone where the multi-pass transmission is frequent.

Further, the switching operation during the noise detection is performed only once. Therefore, the affection of the switching of the antennas to the sound signal is reduced.

Figure 18:
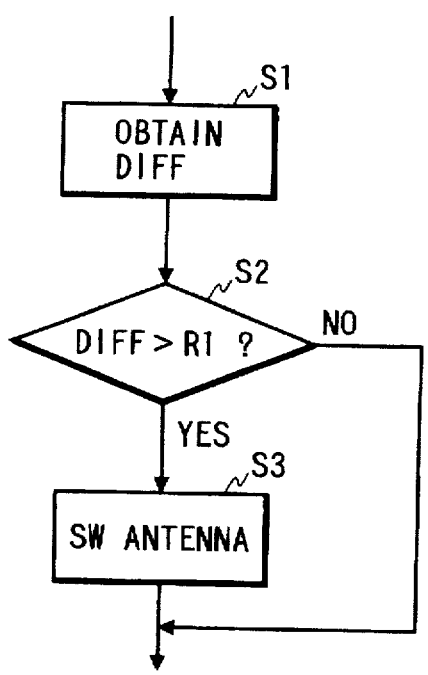
FIG. 18 is a diagram of a flow chart of a modification of the seventh embodiment.

A modification of the seventh embodiment will be described. FIG. 18 is a diagram of a flow chart of the modification of the seventh embodiment. After the detection of the noise component, the control circuit 111 obtains a difference between the amounts of the noise derived from the target antennas (2 and 4) in step s1. In the following step s2, the control circuit 111 makes a decision as to whether or not the difference is larger than a reference value R1. If the difference is larger than a reference value R1, the control circuit 111 operates the antenna switch circuit 105 to select the antenna indicated by the noise detection result. However, if the difference is not larger than the reference value R1, the control circuit 111 does not select a new antenna and holds the selection make at the last antenna selection operation for the following vertical scanning period. This modification reduces the affection of switching of antennas to the sound noise.

In this embodiment, the level detection is made for the video signal from the television tuner. However, the level detection can be made for an intermediate frequency signal from the television tuner as mentioned at the embodiments mentioned earlier. Moreover, it is possible that the antenna selection is made every integer times the vertical synchronizing periods. Moreover, the antenna selection period can be changed in accordance with the speed signal or a frequency of the television signal as described in the embodiments mentioned earlier.

An eighth embodiment will be described. FIG. 19 is a diagram of a timing chart of the eighth embodiment. The diversity receiving apparatus of the eighth embodiment has the same structure as the seventh embodiment. The difference is in that the control circuit 111 effects an operation C obtaining a difference between the levels derived from the target antennas (2 and 4) and determining the antenna to be newly selected in accordance with the difference. That is, the control circuit 111 obtains difference in the level between the selected antenna (2) and the target antenna (4) providing the largest level of the video signal among the antennas except the selected antenna (2) and makes a decision as to whether the difference exceeds a reference R2. If the difference exceeds the reference R2 the control circuit does not executes the operation B, so that the newly selected antenna is coupled at the next equalizing pulse and the antenna 2 is disconnected from the television tuner. Therefore, the reset signal 117 and the sampling signal 117b are not generated. On the other hand, if the difference does not exceed the reference R2 the control circuit 111 executes the operation B to detects the noise amount, so that the newly selected antenna is determined in accordance with the noise amount as described in the seventh embodiment shown in FIG. 16. The reference is determined to be ±6 to ±10 dB from the level of the video signal detected at the last antenna selection operation.

Generally, when the difference in the detection level of the video signal between the target antenna exceeds the reference R2, the antenna indicated by the result of the noise amount detection corresponds to the antenna indicated by the antenna providing the largest level having a difference larger than the reference R2. Therefore, the switching operation of the antennas for detecting the noise amount can be eliminated, so that the affection of the switching operation of the antennas to the sound noise can be reduced.

Figure 20:
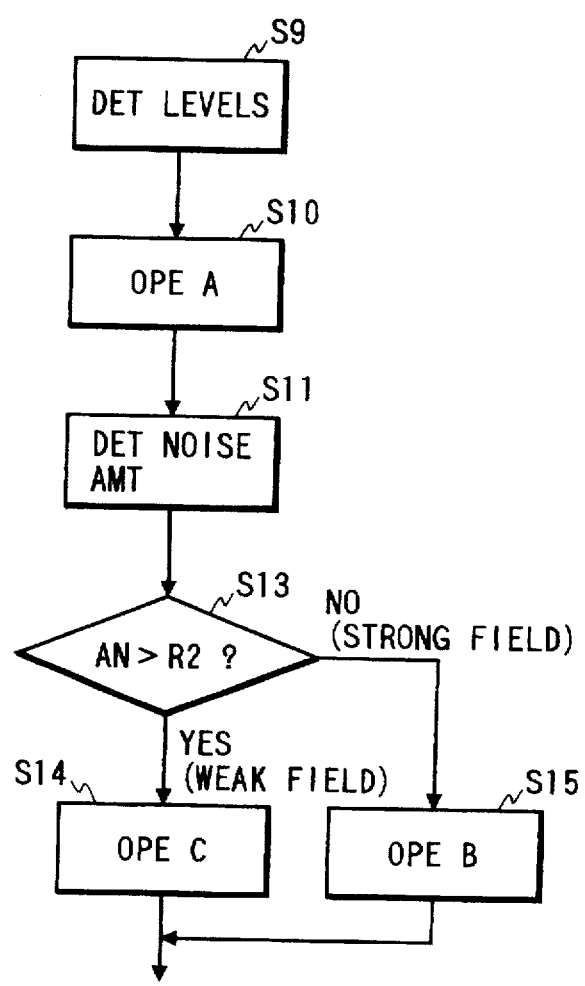
FIG. 20 is a diagram of a flow chart of a ninth embodiment.

A ninth embodiment will be described. FIG. 20 is a diagram of a flow chart of the ninth embodiment. The diversity receiving apparatus of the ninth embodiment has the similar structure to the diversity receiving apparatus of the seventh embodiment. The difference is in that the control circuit 111 checks field intensities at respective antennas to select one of antennas for receiving the following vertical scanning period. The control circuit 111 operates the level detection circuit 107 to detect levels of the video signal derived from respective antennas 1 to 4 as mentioned in the seventh embodiment.

That is, the control circuit 111 executes a processing shown in the flow chart in FIG. 20. In step s9, the control circuit 111 operates the level detection circuit 107 to detect levels of the video signal derived from respect antennas. In the following step s10, the control circuit 111 executes the operation A mentioned in the eighth embodiment. That is, the control circuit 111 determines one of antennas 1 to 4 providing a largest detected level except the antenna which has been selected at the last antenna selection operation (previously selected antenna) by comparing the levels of the video signal derived from the antennas except the previously selected antenna. Then, the control circuit 111 determines the antenna (4) providing the largest level except the previously selected antenna (2) as a target antenna of which noise level is to be measured.

In the following step s11, the control circuit 111 supplies the reset signal 117a to the noise detection circuit 110 and the antenna switching control signal 115 to the antenna switching circuit 105 to select the antenna 2 and then, supplies the sampling signal 117b to the noise detection circuit 110 at the middle of the pedestal period to measure an amount of noise component derived from the antenna 2. Then, the control circuit 111 supplies the reset signal 117a to the noise detection circuit 110 again and the antenna switching control signal 115 to the antenna switching circuit 105 to select the antenna 4 and then, supplies the sampling signal 117b to the noise detection circuit 110 at the middle of the pedestal period to measure an amount of noise component derived from the antenna 4.

In the following step s12 the control circuit 111 predicts a field intensity at the selected antenna (2) by the amount of detected noise component. That is, generally, the field intensity is inversely proportional to the amount of noise. Therefore, if the amount of noise AN is larger than R2, the control circuit 111 predicts, i.e., judges, that the field intensity is small or insufficient (weak field) and processing proceeds to step s14. In step s14, the control circuit 111 executes an operation C. That is, the control circuit 111 determines the antenna to be selected in accordance with the detected levels of the video signal. Thus, the control circuit 111 selects the antenna providing the largest detection level of the video signal without the switching operation and noise detection operation which generates the noise to the reproduced sound.

In step s13, if the amount of noise is not larger than R2, the control circuit 111 judges that the field intensity is sufficient (strong field) and processing proceeds to step s15. In step s15, the control circuit 111 executes the operation B. That is, the control circuit 111 compares the amounts of noise components derived from the previously selected antenna (2) and the target antennas (4) and selects the antenna (4) showing a smaller amount of noise component. In this example, the antenna 4 provides a smaller amount of noise component, so that the antenna 4 is selected in this antenna selection operation. Therefore, the control circuit 111 operates the antenna switching circuit 105 to select the antenna 4 and holds this state until the next antenna selection operation (vertical retrace period) and stores the data indicative of the selected antenna 4 used in the operation B.

As mentioned, in this embodiment, the field intensity is predicted by the amount of noise and if the field intensity is insufficient, the antenna showing a largest level of video signal is selected. Therefore, an erroneous selection of an antenna provided by comparing amounts of noise due to a small field intensity can be prevented. The receiving condition can be improved when the field intensity is small.

Moreover, if the field intensity is judged to be insufficient, the switching operation of antennas is not performed, so that the switching noise in the reproduced sound which tends to be prominent at an insufficient field intensity condition can be eliminated.

In this embodiment, the field intensity is predicted by the amount of noise. However, it is also possible to predict the field intensity from an AGC (automatic gain control) voltage from an AGC amplifier provided in the television tuner 106. FIG. 2B is a block diagram of a automatic gain control amplifier used in the television receivers shown in FIG. 15.

A tenth embodiment will be described. The diversity receiving apparatus of the tenth embodiment has the same structure as the diversity receiving apparatus of the eighth embodiment. The difference between the tenth embodiment and the eighth embodiment is in that if the target antenna currently determined agrees with the target antenna determined at the last antenna selection operation, the antenna previously selected at the last antenna selection operation is used for the following vertical scanning period.

Figure 21:
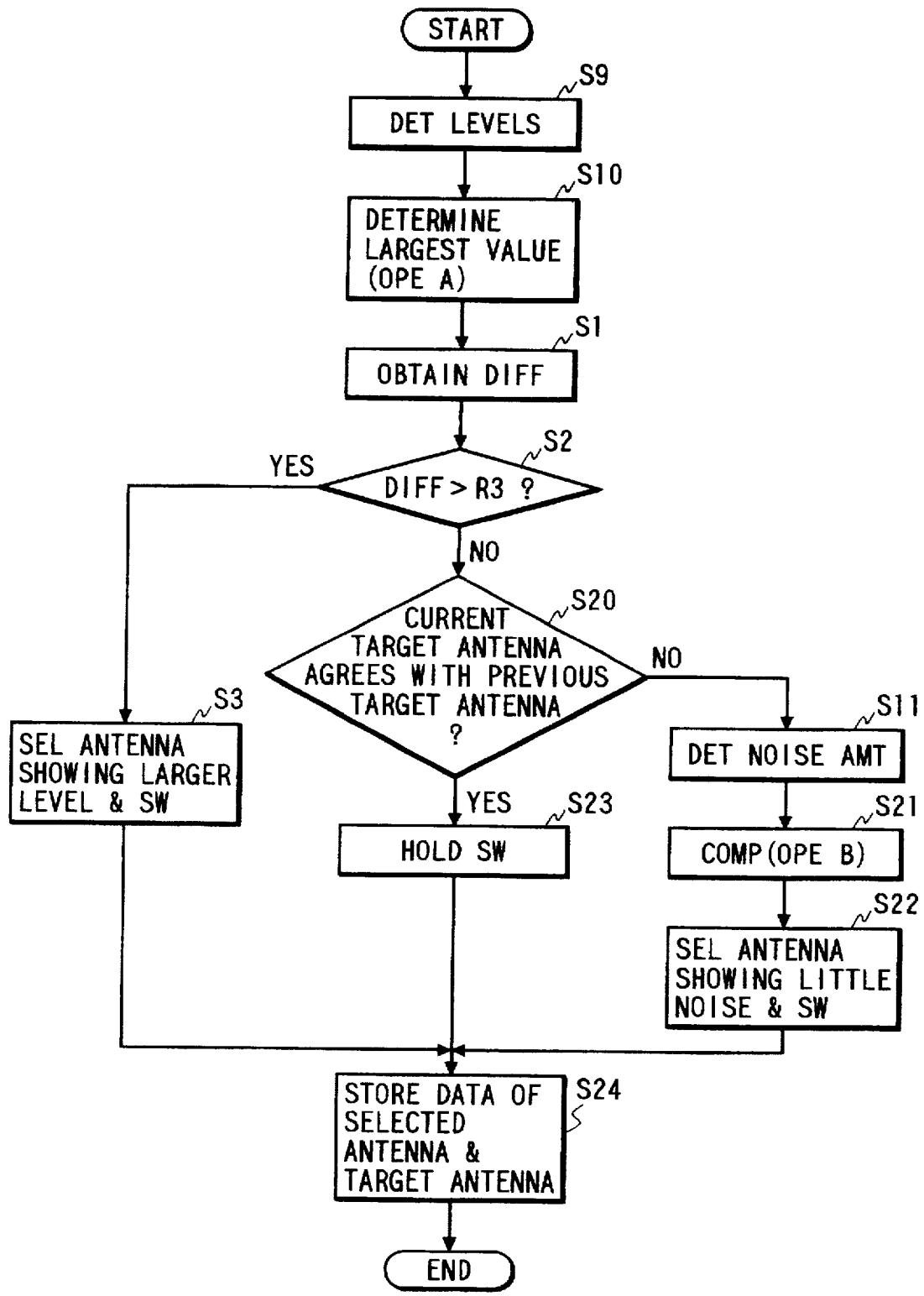
FIG. 21 is a diagram of a flow chart of a tenth embodiment.

FIG. 21 is a diagram of a flow chart of the tenth embodiment. In step s9, the control circuit 111 operates the level detection circuit 107 to detect a level of the video signal 112 and generates a level detection result 118 in response to the level detection timing signal 116 from the control circuit 111. More specifically, the level detection circuit 107 detects the level of the video signal at a middle of pedestal period of consecutive equalizing pulses for a several to a ten microseconds every a predetermined interval, for example, a half of a horizontal scanning period (½ H). During this operation, the control circuit 111 operates the antenna switching circuit 105 through the antenna switching control signal 115 to select respective antennas 1 to 4 successively, so that levels of the video signal derived from respective antennas 1 to 4 are obtained and supplied to the control circuit 111 as the level detection result 118.

Then, the control circuit 111 executes an operation A. That is, the control circuit 111 determines one of antennas 1 to 4 providing a largest detected level except the previously selected antenna by comparing the levels of the video signal derived from the antennas except the previously selected antenna. Then, the control circuit 111 determines the target antenna (4) providing the largest level except the previously selected antenna (2) as a target antenna of which noise is to be detected.

In the following step s1, the control circuit 111 obtains a difference in the level between the previously selected antenna (2) and the target antenna (4) providing the largest level of the video signal among the antennas except the previously selected antenna (2) and makes a decision as to whether the difference exceeds a reference R3. If the difference exceeds the reference R3 the control circuit 111 determines the antenna showing a largest level among the antennas 1 to 4 and then, the control circuit 111 controls the antenna switching circuit 105 to select the antenna showing the largest level among the antennas 1 to 4 in step s3.

If the difference is not larger than R3, the control circuit 111 compares data of previous target antenna stored in the memory therein with data of the current target antenna. If the data of previous target antenna agrees with the current target antenna (2), the control circuit 111 holds the switching state of the antenna switching circuit 105, that is, the control circuit 111 uses the previously selected antenna for the following vertical scanning period also in step s23.

If the data of previous target antenna does not agree with the current target antenna, the control circuit 111 executes the noise detection operation in step s11 as follows:

The control circuit 111 supplies the reset signal 117a to the noise detection circuit 110 and the antenna switching control signal to the antenna switching circuit 105 to select the antenna 2 and then, supplies the sampling signal 117b to the noise detection circuit 110 at the middle of the pedestal period to measure an amount of noise component derived from the antenna 2. Then, the control circuit 111 supplies the reset signal 117a to the noise detection circuit 110 again and the antenna switching control signal 115 to the antenna switching circuit 105 to select the antenna 4 and then, supplies the sampling signal 117b to the noise detection circuit 110 at the middle of the pedestal period to measure an amount of noise component derived from the antenna 4.

Then, the control circuit 111 executes an operation B. That is, the control circuit 111 compares the amounts of noise components derived from the previously selected antenna (2) and the target antenna (4) and selects the antenna (4) showing a smaller amount of noise component. In this example, the antenna 4 provides a smaller amount of noise component, so that the antenna 4 is selected in this antenna selection operation. Therefore, in step s22, the control circuit 111 operates the antenna switching circuit 105 to select the antenna 4 and holds this state until the next antenna selection operation (vertical retrace period) and stores the data indicative of the selected antenna 4 and the target antenna (4) used in the operation B.

In the step s24 after step s3, s23, or s22, the control circuit 111 stores data of the selected antenna and the target antenna in the memory thereof.

As mentioned, in this embodiment, the difference in level of the video signal between the previously selected antenna and the target antenna and if the difference is not larger than the reference R3 and the currently determined target antenna agrees with the previously determined target antenna of which data is stored in the memory in the control circuit 111, the control circuit 111 holds the switching state of the antennas, that is, uses the previously selected antenna for the following vertical scanning period also. Therefore, undesirable switching of antennas are prevented, so that the affection of the switching noise to the reproduced sound can be reduced.

Moreover, in this embodiment, if the condition that the target antenna currently determined agrees with the previous target antenna continues for a long period, the selected antenna is not changed. However, it is also possible that if the count of this agreement during the antenna selection operations exceeds a predetermined number, the control circuit 111 executes the selection of antennas in accordance with the noise level.

Figure 22:
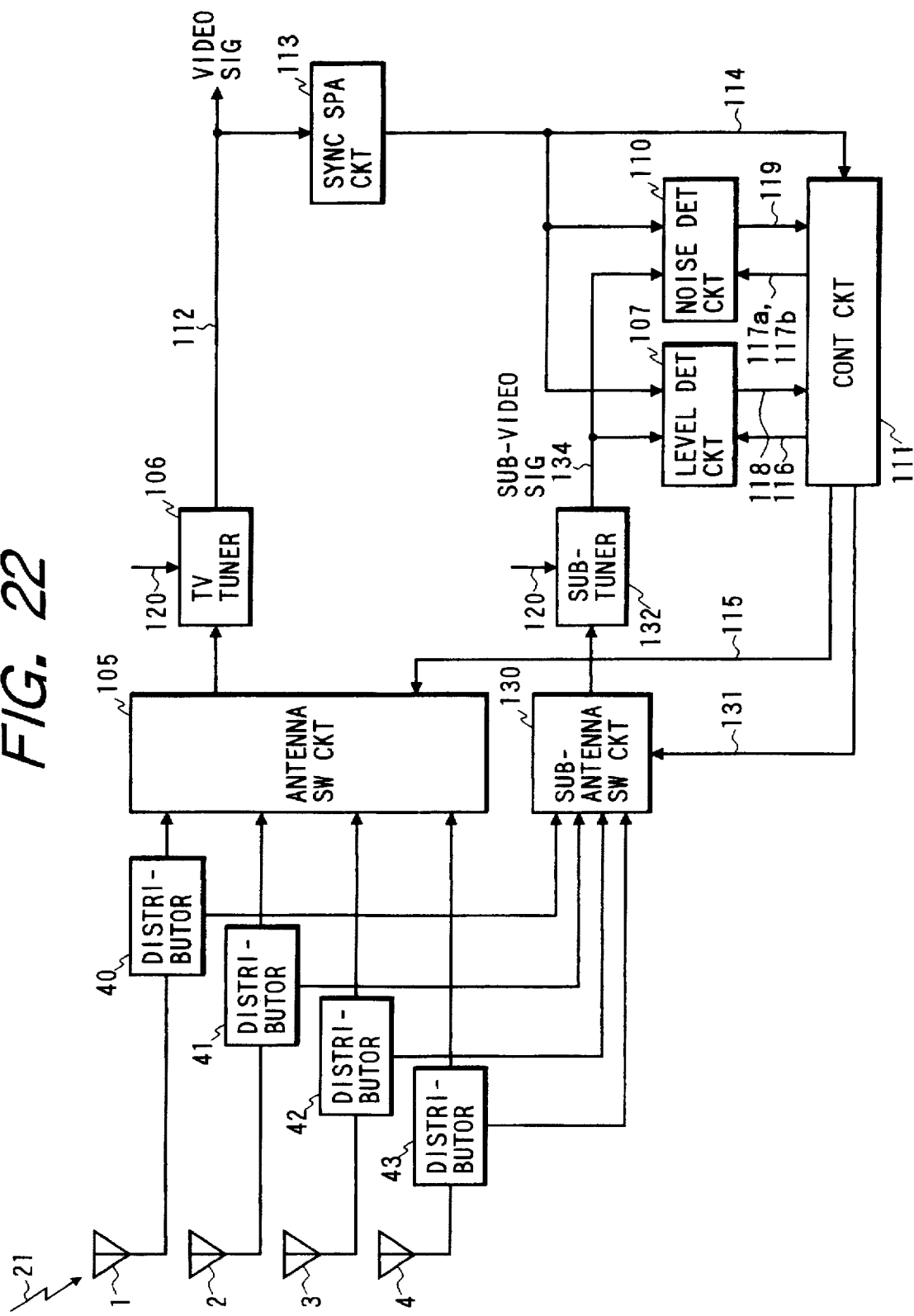
FIG. 22 is a block diagram of an eleventh embodiment.
Figure 23:
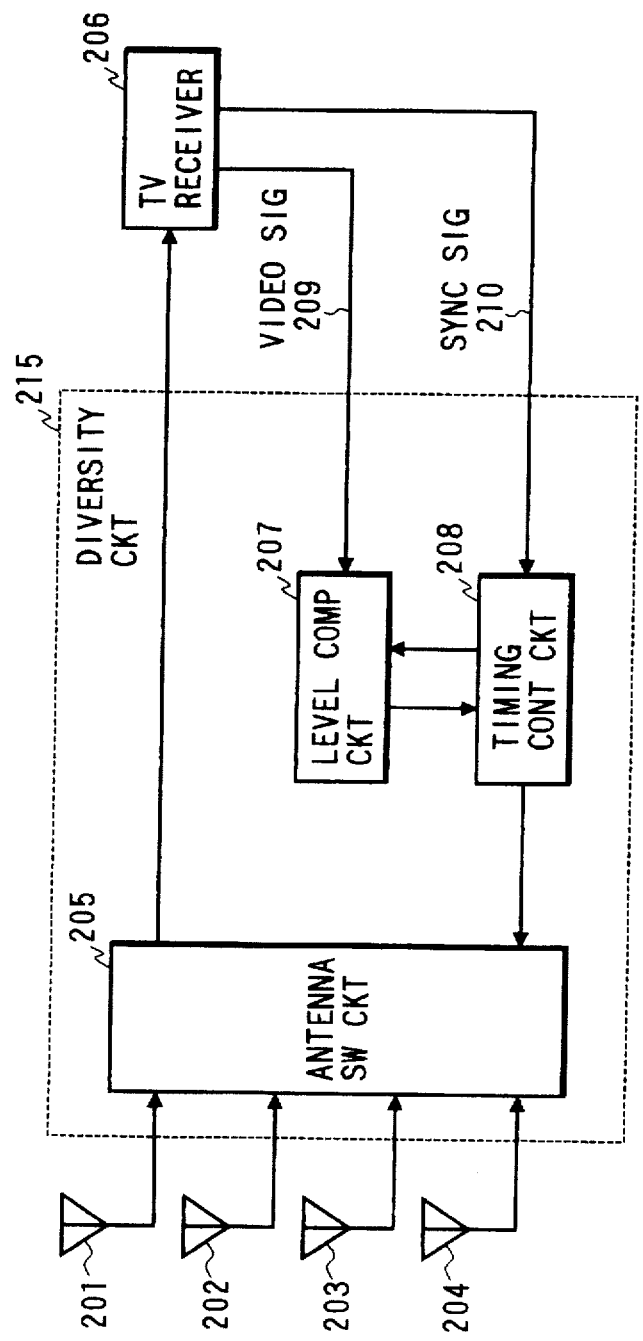
FIG. 23 is a block diagram of a prior art diversity receiving apparatus for a vehicle.

An eleventh embodiment will be described. FIG. 22 is a block diagram of the eleventh embodiment. The diversity receiving apparatus of the eleventh embodiment has the same structure as the diversity receiving apparatus of the seventh embodiment. The difference between the eleventh embodiment and the seventh embodiment is in that distributors 40 to 43, a sub-antenna switching circuit 130, and a sub-tuner 132 are further provided.

The respective antennas 1 to 4 receive the television radio wave signal 21. The distributors 40 to 43 separate and supplies the received television radio wave signals to the antenna switching circuit 105 and the sub-antenna switching circuit 130. The antenna switching circuit 105 selectively supplying one of outputs of the antennas 1 to 4 to the television tuner 106 in accordance with the switching control signal 115. The television tuner 106 effects a tuning to select one channel of television signal from an output of the antenna switching circuit 6 in accordance with a channel selection control signal 120 and supplies the composite video signal 112 to the synchronizing signal separation circuit 113 and externally outputs the video signal 112. The synchronizing signal separation circuit 113 separates the synchronizing signal 114 from the video signal 112.

FIG. 16 is a timing chart of the eleventh embodiment which is used in the seventh embodiment. This example shows the case where the antenna 2 is switched to the antenna 4 for example.

The antenna switching circuit 130 selectively supplying one of outputs of the antennas 1 to 4 to the television tuner 106 in accordance with the switching control signal 131, wherein the antenna switching circuit 105 and the sub-antenna switching circuit 130 selects antennas independently each other. The sub-television tuner 132 effects a tuning to select one channel of television signal from an output of the antenna switching circuit 6 in accordance with the channel selection control signal 120 and supplies a sub-video signal 134 to the level detection circuit 107 and the noise detection circuit 110. The sub-tuner 132 is supplied with the channel selection control signal 120 which is also supplied to the television tuner 106, so that the same channel of a television signal is tuned in the television tuner 106 and the sub-tuner 132. The control circuit 111 comprises a microprocessor. The antenna switching circuit 105, the sub-antenna switching circuit 130, the level detection circuit, and the noise detection circuit 110 are operated under the control of the control circuit 111 as shown in FIG. 16 as described in the seventh embodiment. However, the antenna switching circuit is not switched during the antenna selection operation, so that the occurrence of switching noises in the reproduced picture image and the reproduced sound are prevented.

The level detection circuit 107 detects a level of the video signal 112 and generates a level detection result 118 in response to the level detection timing signal 116 from the control circuit 111. More specifically, the level detection circuit 107 detects the level of the video signal at a middle of pedestal period of an equalizing pulse period for a several to a ten microseconds every a predetermined interval, for example, a half of a horizontal scanning period (½ H). During this operation, the control circuit 111 operates the sub-antenna switching circuit 130 through the antenna switching control signal 311 to select one of antennas 1 to 4 successively, so that levels of the video signal derived from respective antennas 1 to 4 are obtained and supplied to the control circuit 111 as the level detection result 118. However, the antenna switching circuit 105 holds the switching state during this operation until the selected antenna is determined. Therefore, the switching noise during the determining the selected antenna is free in the video signal to be reproduced.

Then, the control circuit 111 execute the operation A. That is, the control circuit 111 determines one of antennas 1 to 4 providing a largest detected level except the antenna which has been selected at the last antenna selection operation (previously selected antenna) by comparing the levels of the video signal derived from the antennas except the previously selected antenna during an operation A. Then, the control circuit determines the antenna (4) providing the largest level except the previously selected antenna (2) and the previously selected antenna as target antennas of which noise levels are measured.

The control circuit 111 supplies the reset signal 117a to the noise detection circuit 110 and the antenna switching control signal to the antenna switching circuit 105 to select the antenna 2 and then, supplies the sampling signal 117b to the noise detection circuit 110 at the middle of the pedestal period to measure an amount of noise component derived from the antenna 2. Then, the control circuit 111 supplies the reset signal 117a to the noise detection circuit 110 again and the antenna switching control signal 115 to the antenna switching circuit 105 to select the antenna 4 and then, supplies the sampling signal 117b to the noise detection circuit 110 at the middle of the pedestal period to measure an amount of noise component derived from the antenna 4.

Then, the control circuit 111 executes the operation B. That is, the control circuit 111 compares the amounts of noise components derived from the targets antennas (2 and 4) and selects the antenna (4) showing a smaller amount of noise component. In this example, the antenna 4 provides a smaller amount of noise component, so that the antenna 4 is selected in this antenna selection operation. Therefore, the control circuit 111 operates the antenna switching circuit 105 to select the antenna 4 and holds this state until the next antenna selection operation (vertical retrace period) and stores the data indicative of the selected antenna 4 used in the operation B.

As mentioned, during the determining operation of selection of antenna to be used, the control circuit 111 operates the sub-antenna switching circuit 130 through the antenna switching control signal 311 to select one of antennas 1 to 4 successively. However, the antenna switching circuit 105 holds the switching state during this operation until the selected antenna has been determined. Therefore, the switching noise during the determination operation of the selected antenna is free in the video signal to be reproduced.

As mentioned, according to the seventh to eleventh embodiments, a diversity receiving apparatus providing a video signal showing a less disturbance in the reproduced image because the antenna selection is performed such that the video signal includes a fewer amount of noise. This is because the antenna selection is performed in consideration of the amount of noise in addition of the level. Moreover, the difference in level between the target antenna and the selected antenna is obtained and if the difference is larger than a reference R2, the detection of noise is not made, so that the affection of the switching noise to the reproduced sound is reduced further.

Moreover, in the insufficient field strength condition, the noise detection and selection of antenna in accordance with the noise detection is not made but the antenna is selected in accordance with the level of the received video signal, so that an erroneous detection of the amount of noise can be prevented and the affection of the switching noise to the reproduced sound is also reduced.

What is claimed is:

1. A diversity receiving apparatus for a mobile unit, comprising:

a plurality of antennas for receiving a radio wave television signal;

switching means for selecting one of said plurality of antennas and supplying said radio wave television signal from one of said plurality of antennas;

receiving means for receiving said radio wave television signal from said switching means and supplying a television signal including a synchronizing signal;

level detection means for detecting a level of said television signal;

noise level detection means for detecting a noise level included in said television signal; and control means responsive to said synchronizing signal for determining one of plurality of antennas selected by said switching means for the following vertical scanning period of said television signal wherein said control means controls said switching means and said level detection means to successively supply said radio wave television signal from each of said plurality of antennas to said receiving means during a vertical retrace period of said television signal to detect said level derived from said each of plurality of antennas, controls said switching means and said noise level detection means to detect noise levels from a first antenna of said plurality of antenna selected for previous vertical scanning period of said television signal and a second antenna currently providing a largest level except said first antenna, and determines either of said first and second antennas to be selected by said switching means for the following vertical scanning period of said television signal in accordance with the detected noise levels.

2. A diversity receiving apparatus as claimed in claim 1, wherein said control means determines said first antenna for the following vertical scanning period having a smaller noise level.

3. A diversity receiving apparatus as claimed in claim 1, wherein said control means detects said second antenna by comparing the detected levels each other, and detects which antenna of said plurality of antennas provides a largest one of said levels among said plurality of antennas except said first antenna.

4. A diversity receiving apparatus as claimed in claim 1, wherein said control means controls said switching means and said level detection means to successively supply said radio wave television signal from each of said plurality of antennas to said receiving means for substantially consecutive recurrent periods of said vertical retrace period.

5. A diversity receiving apparatus as claimed in claim 1, wherein each of said substantially consecutive recurrent periods is a pedestal period between consecutive equalizing pulses included in said synchronizing signal.

6. A diversity receiving apparatus as claimed in claim 1, further comprising a synchronizing signal separation circuit for separating said synchronizing signal from said video signal.

7. A diversity receiving apparatus as claimed in claim 1, further comprising a field intensity prediction means for predicting a field intensity from a detected noise level by comparing said detected noise level with a predetermined value and said control means selecting the antenna providing a larger one of the detected levels of said video signal for the following vertical scanning period when the detected noise level is less than said predetermined value.

8. A diversity receiving apparatus as claimed in claim 1, further comprising a field intensity prediction means for operating said noise level detection means and said switching means to detect a noise level derived from said first antenna, for predicting a field intensity from a detected noise level by comparing said detected noise level derived from said first antenna with a predetermined value, said control means selecting one of said plurality of antennas providing a larger detected level of said television signal derived from said plurality of antennas for the following vertical scanning period when the detected noise level derived from said first antenna is less than said predetermined value without controlling said switching means to detect noise levels from said plurality of antennas other than said first antenna.

9. A diversity receiving apparatus as claimed in claim 1, further comprising operation means for obtaining a difference between said detected noise levels of said first and second antennas, for comparing means for comparing said difference with a predetermined value, said control means selecting said first antenna for the following vertical scanning period when the difference is less than said predetermined value.

10. A diversity receiving apparatus as claimed in claim 1, wherein said receiving means comprising intermediate-frequency signal generation means for generating an intermediate-frequency signal as said television signal from the received radio wave television signal, said level detection means detecting said level of said television signal from said intermediate-frequency signal.

11. A diversity receiving apparatus as claimed in claim 1, further comprising an operation means for obtaining a difference between said detected levels of said first and second antennas, for comparing means for comparing said difference with a predetermined value, said control means determining one of said plurality of antennas providing a largest level detected by said level detection means for the following vertical scanning period when the difference is larger than said predetermined value without controlling said switching means to detect noise levels from said plurality of antennas other than said first antenna, said control means determining either of said first and second antennas to be selected by said switching means for the following vertical scanning period of said television signal in accordance with the detected noise levels when the difference is not larger than said predetermined value.

12. A diversity receiving apparatus as claimed in claim 1, further comprising storing means for storing data indicative of said second antenna and comparing means for comparing said data and said second data currently providing a largest level except said first antenna, said control means determines said first antenna to be selected by one of said plurality of antennas to be selected by said switching means for the following vertical scanning period of said television signal when said data agrees with said second data currently providing a largest level except said first antenna without controlling said switching means to detect noise levels from said plurality of antennas other than said first antenna.

* * * * *